United States Patent
Arai et al.

(10) Patent No.: US 11,428,266 B2
(45) Date of Patent: Aug. 30, 2022

(54) SLIDE BEARING

(71) Applicant: NTN CORPORATION, Osaka (JP)

(72) Inventors: Takao Arai, Mie (JP); Fuyuki Ito, Mie (JP); Tetsuya Kurimura, Mie (JP); Shinji Komatsubara, Mie (JP); Katsuo Shibahara, Mie (JP); Kazuyoshi Harada, Mie (JP)

(73) Assignee: NTN CORPORATION, Osaka (JP)

(*) Notice: Subject to any disclaimer, the term of this patent is extended or adjusted under 35 U.S.C. 154(b) by 624 days.

(21) Appl. No.: 16/330,432

(22) PCT Filed: Sep. 4, 2017

(86) PCT No.: PCT/JP2017/031782
§ 371 (c)(1),
(2) Date: Mar. 5, 2019

(87) PCT Pub. No.: WO2018/047765
PCT Pub. Date: Mar. 15, 2018

(65) Prior Publication Data
US 2021/0285491 A1   Sep. 16, 2021

(30) Foreign Application Priority Data

Sep. 6, 2016   (JP) .............................. JP2016-173632
Sep. 9, 2016   (JP) .............................. JP2016-176064
(Continued)

(51) Int. Cl.
*F16C 33/12*   (2006.01)
*B22F 5/10*   (2006.01)
(Continued)

(52) U.S. Cl.
CPC ................. *F16C 33/12* (2013.01); *B22F 3/12* (2013.01); *B22F 5/00* (2013.01); *B22F 5/10* (2013.01);
(Continued)

(58) Field of Classification Search
CPC ...................... F16C 33/104; F16C 33/102–109
See application file for complete search history.

(56) References Cited

U.S. PATENT DOCUMENTS 5,697,709 A * 12/1997 Mori ...................... F16C 33/102
384/297
2006/0251348 A1* 11/2006 Egami ...................... F16C 33/10
384/58

(Continued)

FOREIGN PATENT DOCUMENTS

CN        102345677        2/2012
EP        0045706 A1 *     2/1982   ............ F16C 33/128
(Continued)

OTHER PUBLICATIONS

JPS4892208A English language translation (Year: 1973).*
(Continued)

*Primary Examiner* — Anthony J Zimmer
*Assistant Examiner* — Sean P. O'Keefe
(74) *Attorney, Agent, or Firm* — Wenderoth, Lind & Ponack, L.L.P.

(57) ABSTRACT

Provided is a slide bearing (bearing sleeve (8)), comprising an oxidized green compact in which particles (11) of metal powder are bonded to each other by an oxide film (12) formed on surfaces of the particles (11). The oxidized green compact has a bearing surface (A, B) configured to slide, through intermediation of a lubricating film, relative to a mating member (shaft member (2)) to be supported. The bearing surface (A, B) has a large number of opening
(Continued)

portions (13a), and the large number of opening portions (13a) and inner pores (13b) are interrupted in communication therebetween by the oxide film (12).

13 Claims, 7 Drawing Sheets

(30) Foreign Application Priority Data

Nov. 30, 2016 (JP) .............................. JP2016-233426
Dec. 12, 2016 (JP) .............................. JP2016-240219

(51) Int. Cl.
| | | |
|---|---|---|
| B22F 3/12 | (2006.01) | |
| B22F 5/00 | (2006.01) | |
| F16C 17/02 | (2006.01) | |
| F16C 17/10 | (2006.01) | |
| H02K 5/167 | (2006.01) | |
| B22F 3/26 | (2006.01) | |

(52) U.S. Cl.
CPC .............. *F16C 17/02* (2013.01); *F16C 17/10* (2013.01); *H02K 5/167* (2013.01); *B22F 3/26* (2013.01); *B22F 2301/35* (2013.01); *B22F 2302/25* (2013.01)

(56) References Cited

U.S. PATENT DOCUMENTS

| | | |
|---|---|---|
| 2009/0073596 A1 | 3/2009 | Asada et al. |
| 2012/0027635 A1 | 2/2012 | Takezaki et al. |
| 2016/0040712 A1 | 2/2016 | Komatsubara et al. |
| 2016/0138651 A1 | 5/2016 | Kurimura et al. |
| 2017/0266725 A1 | 9/2017 | Kurimura |

FOREIGN PATENT DOCUMENTS

| | | |
|---|---|---|
| JP | 48-92208 | 11/1973 |
| JP | 57-63602 | 4/1982 |
| JP | 3377681 | 2/2003 |
| JP | 2003-065324 | 3/2003 |
| JP | 3607661 | 1/2005 |
| JP | 2009-74572 | 4/2009 |
| JP | 2014-181750 | 9/2014 |
| JP | 2016-102553 | 6/2016 |
| WO | 2015/012055 | 1/2015 |
| WO | 2016/084546 | 6/2016 |

OTHER PUBLICATIONS

EP0045706A1 English language translation (Year: 1982).*
International Preliminary Report on Patentability and Written Opinion of the International Searching Authority dated Mar. 12, 2019 in International (PCT) Application No. PCT/JP2017/031782.
International Search Report dated Dec. 5, 2017 in International (PCT) Application No. PCT/JP2017/031782.
Chinese Office Action dated Apr. 1, 2020 in counterpart Chinese Patent Application No. 201780051542.3 with English translation of the Chinese Search Report.
Notice of Reasons for Refusal dated Dec. 15, 2020 in corresponding Japanese Patent Application No. 2016-233426 with English-language translation.

* cited by examiner

EXAMPLE

COMPARATIVE EXAMPLE

SLIDE BEARING

TECHNICAL FIELD

The present invention relates to a slide bearing configured to slide, through intermediation of a lubricating film, relative to a mating member to be supported.

BACKGROUND ART

In some cases, a sintered oil-impregnated bearing, which is a type of a slide bearing, is used as a rotation support bearing for a compact motor such as a spindle motor for an HDD, a polygon scanner motor for a laser beam printer, or a fan motor for a cooling fan. In the sintered oil-impregnated bearing, inner pores are impregnated with oil (or grease, which similarly applies to the following description). The oil seeps out from a bearing surface so that the oil is supplied to a slide portion between the bearing surface and a shaft, thereby being capable of enhancing lubricity.

However, when the pressure of an oil film in a bearing gap increases, part of the oil escapes to the outside through the inner pores from opening portions of the bearing surface of the sintered oil-impregnated bearing. As a result, the pressure of the oil film decreases, and a load capacity is reduced. In order to suppress such escape of pressure through the opening portions of the bearing surface, for example, in Patent Literature 1 described below, there is disclosed a technology of sealing the opening portions of the bearing surface by sliding a mold (for example, a mandrel) on the bearing surface.

CITATION LIST

Patent Literature 1: JP 3377681 B2
Patent Literature 2: JP 3607661 B2
Patent Literature 3: JP 2016-102553 A
Patent Literature 4: JP 2003-065324 A

SUMMARY OF INVENTION

Technical Problem

<First Object>

However, when the bearing surface is sealed by sliding the mold as described above, the bearing surface is liable to be scratched. Thus, there is a fear in that quality is degraded. Moreover, a step and a mold for sealing the bearing surface are additionally required, which may result in increase in cost.

In addition to the technology described above, as measures for suppressing the escape of pressure through the opening portions of the bearing surface, there have been known, for example, a method of reducing a volume of the inner pores by increasing density through increase in compacting pressure on a green compact and a method of filling the inner pores through impregnation of molten resin or molten metal. However, the increase in density through the increase in compacting pressure on the green compact has limitation in view of, for example, performance of a press machine, strength of the mold, and productivity. Moreover, the sealing with molten resin or molten metal causes difficulty in maintaining accuracy of the bearing surface, and requires a large number of working steps, which may result in increase in cost.

When the bearing surface is formed into a smooth surface by completely sealing the opening portions of the bearing surface or by forming the slide bearing with a material such as ingot steel having no pore, the decrease in oil film pressure can be prevented. However, in this case, supply of oil from the inner pores is lost. Thus, the oil on the slide portion between the bearing surface and the shaft is liable to be depleted, and there is a fear in that seizing caused by contact between the bearing surface and the shaft occurs.

Therefore, the present invention has a first object to increase a load capacity by suppressing escape of pressure through a bearing surface and to prevent seizing by preventing loss of a lubricating film on a slide portion between the bearing surface and a mating member (shaft), without increase in cost.

<Second Object>

A dynamic bearing is configured to support a shaft in a non-contact state with fluid pressure generated in a bearing gap defined between the dynamic bearing and the shaft being rotated relative to the dynamic bearing. An inner peripheral surface of the dynamic bearing has a radial dynamic pressure generating portion (for example, a dynamic pressure groove) configured to generate dynamic pressure in a lubricating fluid, for example, oil (or grease, which similarly applies to the following description) filling the bearing gap.

The dynamic pressure groove is formed, for example, through mold-forming of pressing a mold against a bearing material. For example, in Patent Literature 2 described above, there is disclosed a method of forming a dynamic pressure groove through mold-forming in an inner peripheral surface of a cylindrical sintered compact by sizing after sintering. Specifically, a core rod having a forming pattern corresponding to a shape of the dynamic pressure groove is inserted along an inner periphery of the cylindrical sintered compact. Then, in this state, the sintered compact and the core rod are press-fitted to the die to press the inner peripheral surface of the sintered compact against the forming pattern of the core rod, thereby forming the dynamic pressure groove. After that, the sintered compact and the core rod are raised and removed from the die. With this, the pressure force applied by the die is cancelled, and the sintered compact is radially expanded by spring back. Then, the inner peripheral surface of the sintered compact is separated from the core rod.

In the case in which the dynamic bearing is formed with the sintered metal as described above, after metal powder is formed into the green compact through compression forming, the green compact is subjected to sintering at high temperature (temperature of from 800° C. to 1,300° C. in a case of an iron-based material). However, the dimension accuracy is significantly degraded. Therefore, it is required that the sintered compact be subjected to the sizing described above for correction of dimensions and formation of the dynamic pressure groove, which may result in increase in cost.

For example, in Patent Literature 3 described above, the green compact having the dynamic pressure groove formed therein through mold-forming is heated in a water vapor atmosphere. With this, an oxide film is formed on surfaces of particles of metal powder forming the green compact, and the particles are bonded to each other by the oxide film, thereby improving the strength. The green compact having been subjected to the oxidation treatment in such a manner (hereinafter also referred to as "oxidized green compact") has less strength than the sintered compact. However, the particles thereof are bonded to each other by the oxide film, and hence the green compact has strength to some extent. The heating temperature given during the oxidation treatment (for example, temperature of from 350° C. to 600° C.) is considerably lower than the sintering temperature given in the related art. Thus, changes in dimension of the oxidized green compact and of the dynamic pressure groove are suppressed, thereby being capable of satisfying a required dimension accuracy even without the sizing.

However, according to verification conducted by the inventors of the present invention, it has been found that a surface of the oxidized green compact becomes rougher when the green compact having the dynamic pressure groove is subjected to the water vapor treatment as disclosed in Patent Literature 3 describe above. Specifically, when the green compact is subjected to the water vapor treatment, the production speed of the oxide film is high, and hence the oxide film to be formed on the surface of the green compact becomes thicker, with the result that the roughness or undulation (especially the roughness) of the surface, particularly the bearing surface, of the oxidized green compact becomes larger. The bearing surface of the dynamic bearing is opposed to the mating member (shaft) through an extremely small bearing gap. Thus, when the roughness or undulation of the bearing surface becomes larger, the bearing surface is more liable to be brought into contact with the mating member, and hence there is a fear in that such contact causes generation of noise. Moreover, during low-speed rotation of the shaft immediately after start of rotation or immediately before stop of the shaft, the bearing surface and the shaft slide because the pressure of the lubricating film in the bearing gap is low. However, on this occasion, when the roughness or undulation of the bearing surface is large, wear of the bearing surface and the mating member is promoted.

Therefore, the present invention has a second object to suppress occurrence of noise and suppress wear of a bearing surface and a mating member by enhancing surface accuracy of the bearing surface in a dynamic bearing in which a green compact having a dynamic pressure groove is subjected to oxidation treatment.

<Third Object>

Moreover, a bearing gap of several micrometers is defined between the inner peripheral surface of the dynamic bearing and the outer peripheral surface of the shaft. Thus, it is required that the inner peripheral surface of the dynamic bearing be formed with high accuracy. Moreover, in the inner peripheral surface of the dynamic bearing, there is formed a dynamic pressure groove having a depth that is substantially equal to a width of the bearing gap. However, when the dimension accuracy of the dynamic pressure groove is degraded, the fluid pressure in the bearing gap is not sufficiently increased, with the result that degradation in load capacity or bearing stiffness occurs. Therefore, high dimensional accuracy is required for each of the inner peripheral surface and the dynamic pressure groove of the dynamic bearing.

In Patent Literature 3 described above, the green compact is formed of raw material powder obtained by mixing copper powder and iron powder. However, according to verification conducted by the inventors of the present invention, the following fact has been found. When the green compact containing metal powders of various kinds is subjected to the oxidation treatment, the state of formation of the oxide film differs depending on kinds of metals, and hence the thickness of the oxide film formed on the particle surfaces of the metal powder and adhesiveness between the oxide film and the particles become uneven. As a result, the dimension accuracy of the oxidized green compact is degraded.

Therefore, the present invention has a third object to enhance dimension accuracy of a dynamic bearing formed of an oxidized green compact.

<Fourth Object>

A fluid dynamic bearing device is configured to support the shaft in a non-contact state so that, along with relative rotation between the shaft and the bearing member, the shaft is relatively rotatable by pressure of the oil film formed in the bearing gap between the shaft and the bearing member. The fluid dynamic bearing device is widely used as a compact bearing device for high-speed and high-accuracy rotation, such as an HDD, a polygon mirror motor, or a compact cooling fan motor.

The fluid dynamic bearing device is roughly classified into a full-fill structure and a partial-fill structure. In the full-fill structure, oil (or grease, which similarly applies to the following description) completely fills the inside. In the partial-fill structure, an air layer is present inside.

In the fluid dynamic bearing device of the full-fill type, a position of the oil surface is less liable to fluctuate as compared to the fluid dynamic bearing device of the partial-fill type. Thus, leakage of oil is relatively less liable to occur. However, in general, a seal structure is provided to reliably prevent the leakage of oil. For example, in Patent Literature 4, a seal space having a wedge-shaped cross section (so-called "tapered seal") is defined between an inner peripheral surface of a seal member provided at an opening portion of a housing and a tapered surface provided to an outer peripheral surface of a shaft member. With the tapered seal, the oil surface is maintained in the seal space by a capillary action, and increase in volume of the oil along with temperature rise is alleviated in the seal space, thereby preventing outflow of the oil.

Such seal space described above requires a capacity capable of absorbing the change in volume of the oil along with the temperature change. Thus, as the amount of oil to fill the inside of the fluid dynamic bearing device is larger, it is required to set the capacity of the seal space be larger. In particular, when a porous oil-impregnated bearing formed of a porous material, for example, a sintered metal is used as a bearing member, the oil is impregnated also into the inner pores of the bearing member. Therefore, the amount of oil is increased correspondingly, with the result that the capacity of the seal space is further increased.

Meanwhile, along with downsizing and reduction in thickness of a device into which the fluid dynamic bearing device is to be incorporated, a total length (axial length) of the fluid dynamic bearing device is inevitably restricted. In the case in which the seal space and the radial bearing gap are arranged in an axial direction as in the fluid dynamic bearing device disclosed in Patent Literature 4 described above, when an axial dimension of the seal space is increased in order to assure the capacity of the seal space, the axial length (bearing span) of the radial bearing gap cannot be sufficiently assured, with the result that the bearing may be degraded in load capacity or stiffness.

For example, when the inner pores of the bearing member formed of a sintered metal are reduced, the amount of oil to be impregnated into the bearing member and the total amount of oil to fill the inside of the fluid dynamic bearing device are reduced, thereby being capable of reducing the capacity of the seal space and shortening the axial length of the seal space. As a method of reducing the inner pores of the bearing member, for example, it is conceivable to increase the density of the green compact. However, in this case, a large compacting pressure is required at the time of forming the green compact, with the result that cost may be increased due to increase in size of the forming press machine.

In view of the circumstances described above, with regard to a fluid dynamic bearing device comprising a porous oil-impregnated bearing, the present invention has a fourth object to reduce an axial dimension of a seal space by reducing the amount of oil to fill inside without increase in cost, thereby improving a load capacity and a bearing stiffness through reduction in axial dimension of the fluid dynamic bearing device or increase in the bearing span.
Solution to Problem
<First Invention of Present Application>

According to the first invention of the present application which has been made to achieve the first object, provided is a slide bearing, comprising an oxidized green compact in which particles of metal powder are bonded to each other by an oxide film formed on surfaces of the particles, the oxidized green compact having a bearing surface configured to slide, through intermediation of a lubricating film, relative to a mating member to be supported, wherein the bearing surface has a large number of opening portions, and the large number of opening portions and inner pores are interrupted in communication therebetween by the oxide film.

For the slide bearing according to the present invention, unlike a general sintered bearing, the green compact is not sintered at high temperature (for example, 850° C.), and the green compact is subjected to heating at relatively low temperature (for example, 500° C.). With this, the oxide film is formed on the surfaces of the particles of metal powder forming the green compact, and the particles are bonded to each other by the oxide film. In this case, at least some of the inner pores of the oxidized green compact are filled with the oxide film, and hence oil is less liable to escape to the inside through the surface of the oxidized green compact. Therefore, even without any additional sealing, the escape of pressure through the bearing surface is suppressed, thereby being capable of enhancing the load capacity.

Moreover, the oxide film described above does not completely seal the opening portions of the surface of the oxidized green compact to form the bearing surface into a smooth surface, and a large number of opening portions which are interrupted in communication with the inner pores by the oxide film remain in the surface of the oxidized green compact. Those opening portions serve as oil reservoirs configured to retain the oil, and the oil retained in the opening portions is supplied to the slide portion between the bearing surface and the mating member, thereby being capable of preventing loss of the oil film on the slide portion. The term "inner pore" represents a pore formed with particles which are not exposed to the surface of the oxidized green compact or with the oxide film formed on the surfaces of the particles.

In the slide bearing described above, it is preferred that the oxidized green compact have an oil content ratio of 4 vol % or less, and that the bearing surface have a surface opening ratio of 40% or more. The surface opening ratio represents an area ratio of all of the opening portions in the bearing surface. The opening portions comprise not only the opening portions which do not communicate with the inner pores as described above but also opening portions which communicate with the inner pores.

Further, in the slide bearing described above, it is preferred that the oxidized green compact have an oil passage rate of 0.01 g/10 min or less. The oil passage rate can be calculated in the following manner. Oil is brought into a surface (for example, inner peripheral surface) of the slide bearing. A state in which a predetermined pressure (0.4 MPa in this case) is applied to this oil is held for 10 minutes. Then, a total weight of the oil having seeped out from the opening portions of the surface (for example, outer peripheral surface) on a side opposite to the slide bearing is measured.

The bearing surface can be formed into, for example, a smooth cylindrical surface having no dynamic pressure groove. The slide bearing may form a fluid dynamic bearing by being opposed to the outer peripheral surface of the shaft member having the dynamic pressure groove formed therein, or may form a circular bearing by being opposed to the cylindrical outer peripheral surface of the shaft member.

Further, the bearing surface may comprise a dynamic pressure groove formed through mold-forming. This slide bearing may form a fluid dynamic bearing by being opposed to, for example, the smooth outer peripheral surface or an end surface of the shaft member.

The slide bearing described above may be incorporated into, for example, a fluid dynamic bearing device.

Specifically, there may be obtained a fluid dynamic bearing device, comprising: the slide bearing described above; and a shaft member serving as the mating member inserted along an inner periphery of the slide bearing, wherein the shaft member is supported in a non-contact state so as to be relatively rotatable by pressure of a lubricating film in a radial bearing gap defined between a bearing surface of the slide bearing and an outer peripheral surface of the shaft member.

<Second Invention of Present Application>

According to the second invention of the present application which has been made to achieve the second object, provided is a manufacturing method for a dynamic bearing, comprising: forming a green compact through compression of metal powder and simultaneously forming a dynamic pressure groove in an inner peripheral surface of the green compact; and heating the green compact in an air atmosphere to form an oxide film on surfaces of particles of metal powder forming the green compact and bonding the particles to each other with the oxide film.

As described above, when the green compact is subjected to oxidation treatment in the air atmosphere, an oxidized film is mildly formed on the surface of the green compact, thereby being capable of suppressing roughness or undulation of the surface of the oxidized green compact. For example, according to comparison between an inner peripheral surface of an oxidized green compact (Example) having been subjected to the oxidation treatment in the air atmosphere as illustrated in an upper stage of FIG. 14 and an inner peripheral surface of an oxidized green compact (Comparative Example) having been subjected to the oxidation treatment in a water vapor atmosphere as illustrated in a lower stage of FIG. 14, Example exhibits better surface states in both a crest portion and a groove portion as compared to Comparative Example. As described above, when the bearing surface has small roughness or undulation, occurrence of noise or wear of the bearing surface and the mating member can be prevented. FIG. 14 is an illustration of an inner peripheral surface of an oxidized green compact under a state in which a profile thereof in a circumferential direction is converted into a linear shape. The upper side in FIG. 14 corresponds to the groove portion, and the lower side corresponds to the crest portion.

Incidentally, in the case in which the dynamic pressure groove is formed through mold-forming in the inner peripheral surface of the sintered compact as in Patent Literature 2 described above, it is required that the depth of the dynamic pressure groove be smaller than a spring back amount of the sintered compact given at the time of separation. However, the spring back amount of the sintered compact is small, and hence there is a limit on the depth of the dynamic pressure groove. For example, in a case of the dynamic bearing having an inner diameter of 1.5 mm, the depth of the dynamic pressure groove has a limit of about 3 μm. Meanwhile, the size of the bearing gap defined between the inner peripheral surface of the dynamic bearing and the outer peripheral surface of the shaft is generally set so as to be equal to or smaller than the depth of the dynamic pressure groove in order to assure the fluid pressure. Thus, when the depth of the dynamic pressure groove is 3 μm, typically, the bearing gap is set so as to be equal to or smaller than 3 μm. When the bearing gap is small as described above, the dynamic bearing and the shaft are more liable to be brought into contact with each other, for example, at the time of whirling of the shaft.

In contrast, according to the present invention, the dynamic pressure groove is formed simultaneously with forming of the green compact. The spring back amount (radial expansion amount of the inner peripheral surface) given at the time of separation of the green compact is larger than the spring back amount given at the time of separation of the sintered compact. Thus, when the dynamic pressure groove is formed through mold-forming in the green compact as described above, the depth of the dynamic pressure groove can be set larger than that given in the case in which the dynamic pressure groove is formed through mold-forming in the sintered compact. Specifically, for example, a ratio h/d of a depth h (μm) of the dynamic pressure groove to an inner diameter d (mm) of the green compact can be set to more than 2

With regard to the heating temperature given during the oxidation treatment on the green compact, a temperature significantly lower than the sintering temperature given in the related art is sufficient (for example, 600° C. or lower). With this, the change in dimension of the green compact can be suppressed, thereby being capable of omitting sizing after heating.

According to the manufacturing method described above, there can be obtained a dynamic bearing, which is formed of an oxidized green compact containing particles bonded to each other by the oxide film formed on the surfaces of the particles of metal powder in the air atmosphere, and having the dynamic pressure groove formed in the inner peripheral surface through mold-forming.

When the green compact is formed of metal powders of various kinds, the thickness of the oxide film formed on the surfaces of the particles or the adhesiveness of the oxide film with respect to a base member may differ. Therefore, there is a fear in that the dimension accuracy or the bearing characteristics cannot be satisfied. Thus, it is preferred that the dynamic bearing described above be formed so that 95 wt % or more of the green compact is formed of a metal of a single kind (for example, iron).

When the oxidized green compact is mainly formed of iron, the oxide film is formed of, for example, $Fe_3O_4$, $Fe_2O_3$, or FeO. For example, when the green compact is heated in the water vapor atmosphere, the oxide film is formed of a single phase substantially consisting of $Fe_3O_4$. Meanwhile, when the green compact is heated in the air atmosphere, the oxide film is formed of a mixed phase of $Fe_3O_4$ and $Fe_2O_3$. Thus, in the oxidized green compact mainly formed of iron, when the oxide film is formed of a mixed phase of $Fe_3O_4$ and $Fe_2O_3$, it can be assumed that the oxidized green compact is formed by heating in the air atmosphere.

The dynamic bearing described above can be used, for example, through impregnation of the oil into the inner pores of the oxidized green compact.

The dynamic bearing described above may be incorporated into a fluid dynamic bearing device. Specifically, there may be obtained a fluid dynamic bearing device, comprising: the dynamic bearing described above; and a shaft member inserted along an inner periphery of the dynamic bearing, wherein the shaft member is supported in a non-contact state so as to be relatively rotatable with a dynamic pressure action of a lubricating film generated in a radial bearing gap defined between an inner peripheral surface of the dynamic bearing and an outer peripheral surface of the shaft member.

<Third Invention of Present Application>

According to the third invention of the present invention which has been made to achieve the third object, in a dynamic bearing which comprises a radial dynamic pressure generating portion in an inner peripheral surface thereof and is formed of an oxidized green compact in which particles of metal powder are bonded to each other through intermediation of an oxide film formed on surfaces of the particles, 99 wt % or more of metal powder contained in the oxidized green compact is formed of metal powder of a single kind.

Moreover, the third invention of the present application comprises: forming a green compact through compression of raw material powder containing metal powder of a single kind which occupies 95 wt % or more of the raw material powder and simultaneously forming a radial dynamic pressure generating portion on an inner peripheral surface of the green compact; and heating the green compact to form an oxide film on surfaces of particles of the metal powder forming the green compact and bonding the particles to each other through intermediation of the oxide film to obtain the oxidized green compact.

As described above, according to the present invention, 99 wt % or more of the metal powder contained in the oxidized green compact is formed of metal powder of a single kind, or 95 wt % or more of the raw material powder of the green compact is formed of metal powder of a single kind. As described above, when the green compact is formed of metal powder substantially of a single kind, the oxide film can be evenly formed on the particle surfaces of the metal powder. Therefore, as compared to the case in which metal powders of various kinds are contained, the change in dimension of the green compact due to heating can be suppressed, thereby being capable of enhancing dimension accuracy of the dynamic bearing (oxidized green compact), in particular, enhancing dimension accuracy of the inner peripheral surface and the radial dynamic pressure generating portion (for example, dynamic pressure groove).

The "metal powder of a single kind" referred to in the present invention includes not only the case of powder formed of a single metal, such as iron powder or copper powder, but also a case in which components (compositions) of pre-alloyed power comprising particles containing metal components of various kinds are the same.

In consideration of durability (wear resistance), strength, and ease of formation of the oxide film of the dynamic bearing, it is preferred that iron powder be used as the metal powder of a single kind forming the green compact described above.

In general, kinds of the metal powder include reduced powder, electrolytic powder, and atomized powder. The electrolytic powder includes particles each having a dendritic shape. Thus, the particles are more likely to be entangled with each other, and hence strength required for the dynamic bearing can easily be obtained. However, it is difficult to evenly form the oxide film on surfaces of the particles each having the dendritic shape. The atomized powder includes particles each having a substantially spherical shape. Thus, the oxide film is likely to be evenly formed on the surfaces of the particles. However, the particles are less likely to be entangled, and it is difficult to obtain the strength required for the dynamic bearing. The reduced powder includes particles each having a void. Thus, the particles are likely to be entangled with each other by compression forming, and hence the strength can easily be enhanced. Moreover, the particles of the reduced powder each have a shape relatively close to the spherical shape, and hence the oxide film is likely to be evenly formed on the surfaces of the particles. In view of the foregoing, it is preferred that the reduced powder be used as the metal powder of a single kind forming the green compact described above.

A fluid dynamic bearing device comprising the dynamic bearing described above, a shaft member inserted along an inner periphery of the dynamic bearing, and a radial bearing portion configured to support the shaft member so as to be relatively rotatable with the dynamic pressure action of the oil film generated in the radial bearing gap defined between the inner peripheral surface of the dynamic bearing and the outer peripheral surface of the shaft member has a high dimension accuracy in the dynamic bearing. Thus, the fluid dynamic bearing device has a high load capacity and a high bearing stiffness.

A motor comprising the fluid dynamic bearing device described above, a rotor magnet provided on a rotary side of one of the housing and the shaft member, and a stator coil provided on a stationary side of one of the housing and the shaft member has a high rotation accuracy.

When the green compact is heated in the air atmosphere, the oxide film is more mildly formed on the surface of the green compact as compared to the case in which the green compact is heated in the water vapor atmosphere, thereby being capable of suppressing roughness and undulation of the surface of the oxidized green compact. For example, when the green compact substantially formed only of the iron powder is heated in the air atmosphere, the oxide film is formed of, for example, $Fe_3O_4$, $Fe_2O_3$, or a mixture of $Fe_3O_4$ and $Fe_2O_3$.

<Fourth Invention of Present Application>

According to the fourth invention of the present application which has been made to achieve the fourth object, provided is a fluid dynamic bearing device, comprising: a shaft member; a porous oil-impregnated bearing having the shaft member inserted along an inner periphery thereof; a housing having a bottomed tubular shape, which is configured to retain the porous oil-impregnated bearing on an inner periphery thereof; a seal portion provided to an opening portion of the housing; a radial bearing portion configured to support the shaft member so as to be relatively rotatable with a dynamic pressure action of an oil film generated in a radial bearing gap defined between an inner peripheral surface of the porous oil-impregnated bearing and an outer peripheral surface of the shaft member; and a seal space, which is defined between an inner peripheral surface of the seal portion and an outer peripheral surface of the shaft member, and retains an interface between oil filling the inside of the housing and an atmosphere, wherein the porous oil-impregnated bearing comprises an oxidized green compact in which particles of metal powder are bonded to each other through intermediation of an oxide film formed on surfaces of the particles, and wherein the porous oil-impregnated bearing has an oil content ratio of 4 vol % or less.

For the porous oil-impregnated bearing of the fluid dynamic bearing device according to the present invention, unlike a general sintered bearing, the green compact is not sintered at high temperature (for example, 850° C.), and the green compact is subjected to heating at relatively low temperature (for example, 500° C.). With this, the oxide film is formed on the surfaces of the particles of metal powder forming the green compact, and the particles are bonded to each other by the oxide film. In this case, at least some of inner pores of the oxidized green compact are filled with the oxide film, and the inner pores of the oxidized green compact are reduced, thereby being capable of setting the oil content ratio of the porous oil-impregnated bearing so as to be 4 vol % or less. As described above, when the amount of oil to be impregnated into the porous oil-impregnated bearing is reduced, the total amount of oil to fill the inside of the fluid dynamic bearing device is reduced. With this, the capacity of the seal space for alleviating the change in volume of the oil, in particular, the axial dimension of the seal space can be reduced, thereby being capable of improving the load capacity and the bearing stiffness through reduction in axial dimension of the fluid dynamic bearing device and the increase in bearing span.

For example, when the green compact containing the metal powders of various kinds is subjected to the oxidation treatment, a formation state of the oxide film differs depending on a kind of a metal, and there is a fear in that the thickness of the oxide film or adhesiveness between the oxide film and the particles may become uneven. Thus, it is preferred that the metal powder contained in the porous oil-impregnated bearing described above be substantially formed only of the metal powder of a single kind. Specifically, it is preferred that 99 wt % or more of the metal powder contained in the oxidized green compact forming the porous oil-impregnated bearing be formed of the metal powder of a single kind. In particular, in consideration of the durability (wear resistance) or strength of the porous oil-impregnated bearing and easiness in formation of the oxide film, it is preferred that the iron powder be used as the metal powder of a single kind described above.

The motor comprising the fluid dynamic bearing device described above, the rotor magnet provided on the rotary side of one of the housing and the shaft member, and the stator coil provided on the stationary side of one of the housing and the shaft member is capable of reducing the axial dimension or improving the rotation accuracy.

The porous oil-impregnated bearing described above can be manufactured by forming a green compact through compression of metal powder, heating the green compact to form the oxide film on the surfaces of the particles of the metal powder forming the green compact and bonding the particles to each other through intermediation of the oxide film to obtain an oxidized green compact, and impregnating oil into the inner pores of the oxidized green compact to obtain a porous oil-impregnated bearing having an oil content ratio of 4 vol % or less.

When the green compact is heated in the air atmosphere, the oxide film is more mildly formed on the surface of the green compact as compared to the case in which the green compact is heated in the water vapor atmosphere, thereby being capable of suppressing roughness and undulation of the surface of the oxidized green compact. For example, when the green compact substantially formed only of the iron powder is heated in the air atmosphere, the oxide film is formed of, for example, $Fe_3O_4$, $Fe_2O_3$, or a mixture of $Fe_3O_4$ and $Fe_2O_3$.

Advantageous Effects of Invention

As described above, according to the first invention of the present application, at least some of the inner pores of the slide bearing (green compact) are filled with the oxide film, thereby being capable of suppressing the escape of pressure through the bearing surface and enhancing the load capacity. Moreover, a large number of opening portions serving as oil reservoirs are formed in the bearing surface of the slide bearing, thereby being capable of preventing loss of the oil film on the slide portion with the mating member and preventing seizing.

Further, according to the second invention of the present application, the surface accuracy of the bearing surface can be enhanced in the dynamic bearing in which the green compact having the dynamic pressure groove is subjected to oxidation treatment, thereby being capable of suppressing occurrence of noise and wear of the bearing surface and the mating member.

Further, according to the third invention of the present application, the dimension accuracy of the dynamic bearing formed of the oxidized green compact can be enhanced.

Moreover, according to the fourth invention of the present application, the inner pores of the oxidized green compact are reduced with the oxide film so that the oil content ratio of the porous oil-impregnated bearing can be suppressed. With this, the total amount of oil to fill the inside of the fluid dynamic bearing device can be reduced, thereby being capable of reducing the axial dimension of the seal space. With this, the load capacity and the bearing stiffness can be improved through the reduction in axial dimension of the fluid dynamic bearing device or the increase in bearing span.

DESCRIPTION OF EMBODIMENTS

Embodiment of Present Invention

Now, with reference to FIG. 1 to FIG. 10, description is made of an embodiment of the present invention.

Figure 1:
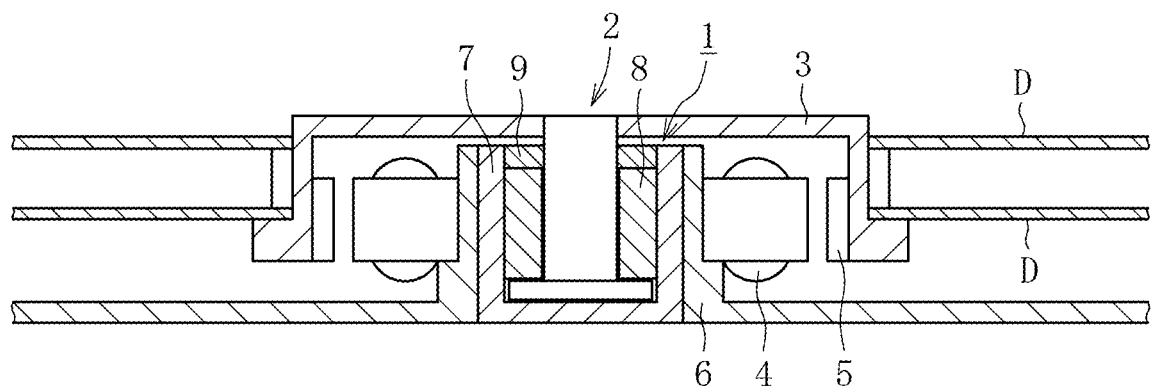
FIG. 1 is a sectional view of a spindle motor.

A spindle motor illustrated in FIG. 1 is to be used for a disc drive device such as an HDD, and comprises a fluid dynamic bearing device 1, a disc hub 3, a stator coil 4, and a rotor magnet 5. The fluid dynamic bearing device 1 is configured to support a shaft member 2 in a non-contact state so as that the shaft member 2 is rotatable. The disc hub 3 is mounted to the shaft member 2. The stator coil 4 and the rotor magnet 5 are opposed to each other, for example, through a gap in a radial direction. The stator coil 4 is mounted to a casing 6, and the rotor magnet 5 is mounted to the disc hub 3. A housing 7 of the fluid dynamic bearing device 1 is mounted on an inner periphery of the casing 6. A predetermined number of discs D such as magnetic discs are held by the disc hub 3. When the stator coil 4 is energized, electromagnetic force generated between the stator coil 4 and the rotor magnet 5 rotates the rotor magnet 5. With this, the disc hub 3 and the shaft member 2 integrally rotate.

Figure 2:
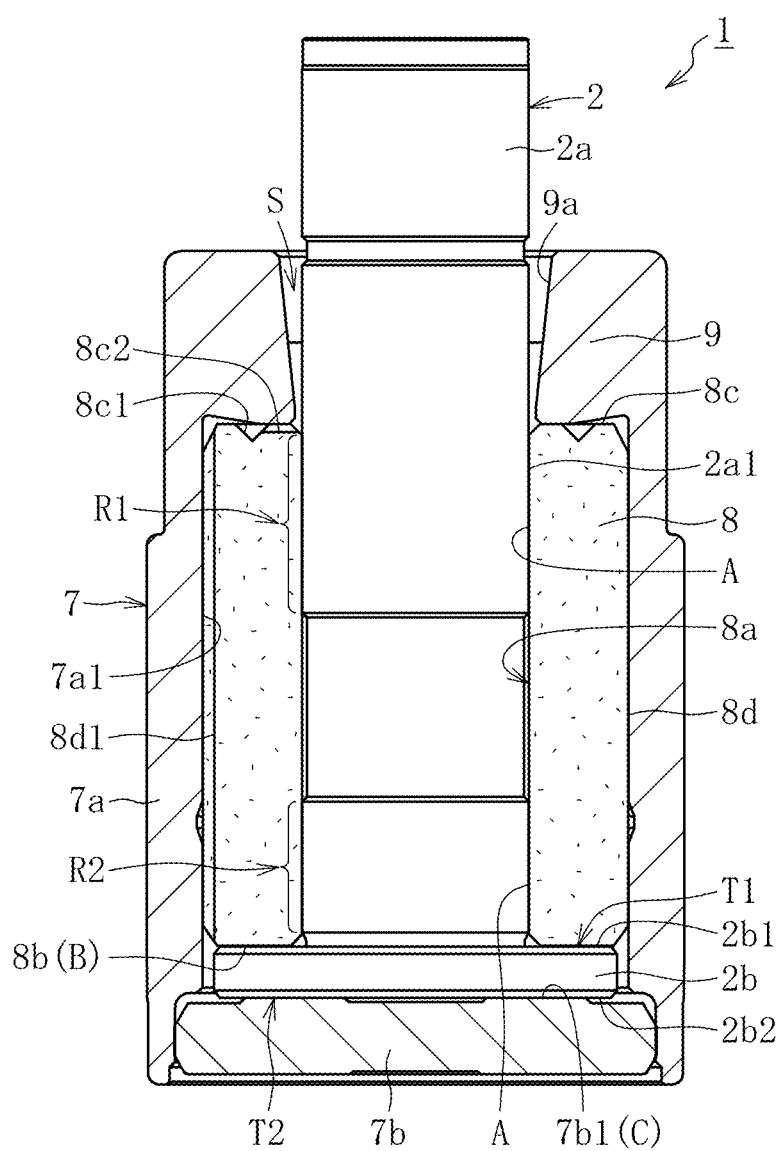
FIG. 2 is a sectional view of a fluid dynamic bearing device.

As illustrated in FIG. 2, the fluid dynamic bearing device 1 comprises a bearing sleeve 8, the shaft member 2, the housing 7, and a seal portion 9. The bearing sleeve 8 serves as a slide bearing (dynamic bearing) according to one embodiment of the present invention. The shaft member 2 serves as a mating member to be supported by the bearing sleeve 8. The housing 7 has a bottomed tubular shape, and is configured to hold the bearing sleeve 8 on the inner periphery thereof. The seal portion 9 is provided at an opening portion formed at one end of the housing 7 in an axial direction. In the illustrated example, the housing 7 and the seal portion 9 form a single component. In the following description, for convenience, a closed side of the housing 7 in the axial direction is referred to as "lower side", and an opened side of the housing 7 is referred to as "upper side". However, the use of such terms is not intended to limit modes of use of the fluid dynamic bearing device 1.

The shaft member 2 comprises a shaft portion 2a and a flange portion 2b provided at a lower end of the shaft portion 2a. The shaft member 2 is formed of, for example, a metal. In this embodiment, the entirety of the shaft member 2 comprising the shaft portion 2a and the flange portion 2b is integrally formed of stainless steel.

Figure 3:
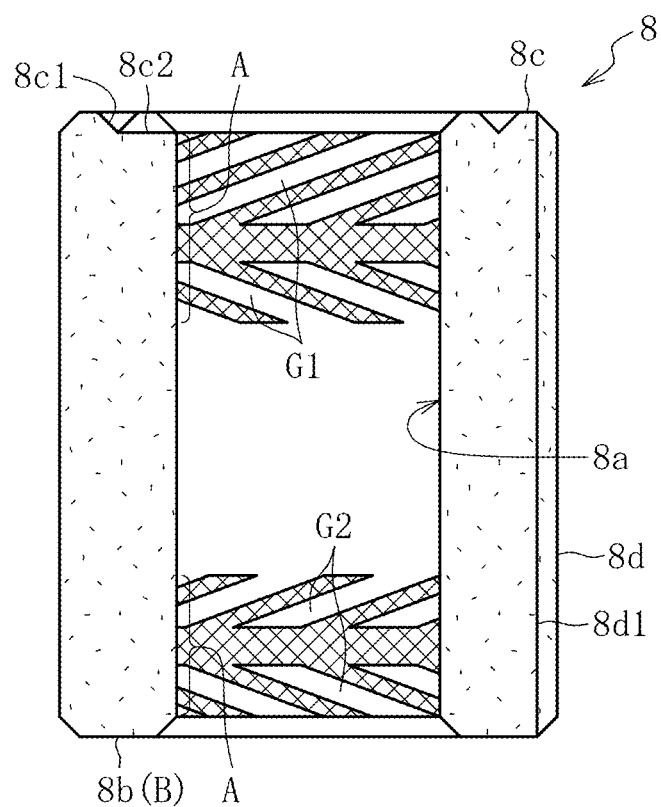
FIG. 3 is a sectional view of a slide bearing (bearing sleeve) in one embodiment of the present invention.

The bearing sleeve 8 has a cylindrical shape, and comprises radial bearing surfaces. The radial bearing surfaces are formed on an inner peripheral surface 8a of the bearing sleeve 8, and are opposed to an outer peripheral surface 2a1 of the shaft member 2. In the illustrated example, radial bearing surfaces A are formed on the inner peripheral surface 8a of the bearing sleeve 8 at two positions apart from each other in the axial direction. In this embodiment, the radial bearing surfaces A each have an inner diameter of from φ3 mm to φ5 mm. The radial bearing surfaces A each have a dynamic pressure groove. In this embodiment, as illustrated in FIG. 3, the radial bearing surfaces A have dynamic pressure grooves G1 and G2, respectively. The dynamic pressure grooves G1 and G2 are each arranged in a herringbone shape. In FIG. 3, regions indicated by cross hatching represent crest portions protruding radially inward (also in FIG. 4).

The dynamic pressure groove G1 formed on the upper side has a non-symmetric shape in the axial direction, and the dynamic pressure groove G2 on the lower side has a symmetric shape in the axial direction. With the dynamic pressure groove G1 having the non-symmetric shape in the axial direction and being formed on the upper side, oil in the radial bearing gap is forced in the axial direction, and the oil is forcibly circulated inside the housing 7. In a region defined between the radial bearing surfaces A in the axial direction, a cylindrical surface which is continuous with groove bottom surfaces of the dynamic pressure grooves G1 and G2 is formed. Both the upper dynamic pressure groove G1 and the lower dynamic pressure groove G2 may have a symmetric shape in the axial direction. Moreover, the upper dynamic pressure groove G1 and the lower dynamic pressure groove G2 may be continuous with each other in the axial direction, or one or both of the upper dynamic pressure groove G1 and the lower dynamic pressure groove G2 may be omitted. Moreover, the radial bearing surface may have a dynamic pressure groove having a spiral shape, or may have a dynamic pressure groove extending in the axial direction. Moreover, the inner peripheral surface 8a (radial bearing surfaces A) may be formed into a cylindrical surface, and a dynamic pressure groove may be formed in the outer peripheral surface 2a1 of the shaft member 2.

Figure 4:
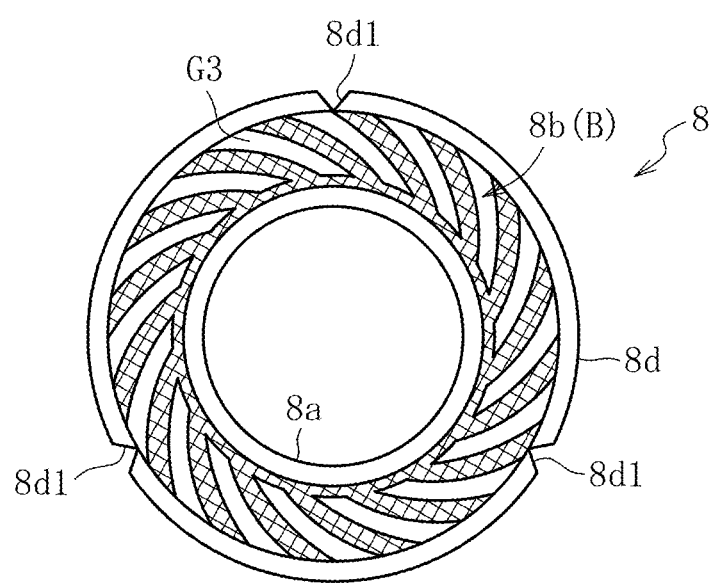
FIG. 4 is a bottom view of the slide bearing.

On a lower end surface 8b of the bearing sleeve 8, there is formed a thrust bearing surface B. The thrust bearing surface B is opposed to an upper end surface 2b1 of the flange portion 2b of the shaft member 2. The thrust bearing surface B has a dynamic pressure groove G3 having a spiral shape of a pump-in type as illustrated in FIG. 4. For example, a herringbone shape or a radial groove shape may be adopted as the shape of the dynamic pressure groove. Moreover, the lower end surface 8b (thrust bearing surface B) of the bearing sleeve 8 may be formed into a flat surface, and a dynamic pressure groove may be formed in the upper end surface 2b1 of the flange portion 2b of the shaft member 2.

An upper end surface 8c of the bearing sleeve 8 has, as illustrated in FIG. 3, an annular groove 8c1 and a plurality of radial grooves 8c2 formed on a radially inner side of the annular groove 8c1. In the outer peripheral surface 8d of the bearing sleeve 8, a plurality of axial grooves 8d1 are formed at equal intervals in the circumferential direction. A space defined on a radially outer side of the flange portion 2b of the shaft member 2 communicates with a seal space S through the axial grooves 8d1, the annular groove 8c1, and the radial grooves 8c2, thereby preventing generation of a negative pressure in this space. The annular groove 8c1 and the radial grooves 8c2 may be omitted when those grooves are not required, and the upper end surface 8c of the bearing sleeve 8 may be formed into a flat surface.

The entire region of the surfaces of the bearing sleeve 8 comprising the groove bottom surfaces of the dynamic pressure grooves G1, G2, and G3 and a top surface and a side surface of a crest portion is a surface formed through mold-forming. The bearing sleeve 8 is not subjected to sizing, and slide marks are not formed on the surface of the bearing sleeve 8.

Figure 5:
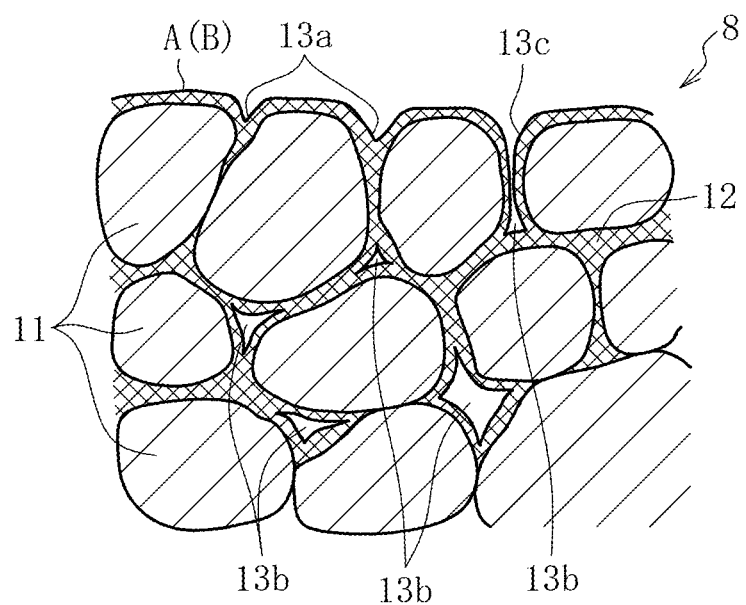
FIG. 5 is a sectional view for illustrating a periphery of a bearing surface of the slide bearing.

The bearing sleeve 8 is a porous oil-impregnated bearing in which oil is impregnated into inner pores of a green compact having been subjected to oxidation treatment, that is, a green compact (oxidized green compact) in which particles of metal powder are bonded to each other through intermediation of an oxide film. The bearing sleeve 8 according to this embodiment includes, for example, a metal of a single kind which occupies 95 wt % or more, and thus is formed of an oxidized green compact formed of metal powder of substantially a single kind. Specifically, 99 wt % or more of the metal powder forming the oxidized green compact is formed of metal powder (containing the oxide film on the particle surfaces) of a single kind. In this embodiment, the bearing sleeve 8 is formed of an oxidized green compact formed only of iron powder (in particular, reduced iron powder) as the metal powder. Specifically, as illustrated in FIG. 5, the bearing sleeve 8 is formed of an oxidized green compact comprising iron particles 11 and an oxide film 12 formed on surfaces of the iron particles 11. The iron particles 11 are bonded to each other by the oxide film 12. More in detail, the oxide film 12 formed on a surface of each iron particle 11 spreads through a space among the iron particles 11 to form a network, thereby assuring the strength of the bearing sleeve 8.

As at least some of gaps (inner pores) among the iron particles 11 are filled with the oxide film 12, the bearing sleeve 8 is reduced in porosity, in particular, porosity (open porosity) communicating with the surface. With this, the oil content ratio of the bearing sleeve 8 is set to, for example, 4 vol % or less, preferably 2 vol % or less. Moreover, the oil passage rate of the bearing sleeve 8 is set to, for example, 0.01 g/10 min or less. The oil content ratio of the bearing sleeve 8 is measured by a measurement method for open porosity given in JIS Z 2501:2000.

The surfaces of the bearing sleeve 8 are not completely sealed by the oxide film 12 to be smooth. The surfaces of the bearing sleeve 8, in particular, the radial bearing surfaces A and the thrust bearing surface B have a large number of opening portions 13a (minute recessed portions). The large number of opening portions 13a and inner pores 13b (pores 13b formed by the iron particles 11 not exposed to the surface of the bearing sleeve 8 or by the oxide film 12 formed on the surfaces of the iron particles 11) are interrupted in communication therebetween by the oxide film 12. That is, before the oxide film 12 is formed, the inner pores 13b and the opening portions 13a communicate with each other. However, when the inner pores 13b and the opening portions 13a are divided by the oxide film 12, the opening portions 13a which are opened only in any one of the surfaces (for example, the inner peripheral surface 8a) are formed. The inner side of the opening portions 13a is closed by the oxide film 12. The large number of opening portions 13a function as oil reservoirs configured to retain oil. In each of the bearing surfaces A and B of the bearing sleeve 8, there are also formed opening portions 13c which communicate with the inner pores 13b. At least some of such opening portions 13c communicate with another surface (for example, the outer peripheral surface 8d) of the bearing sleeve 8.

Figure 6:
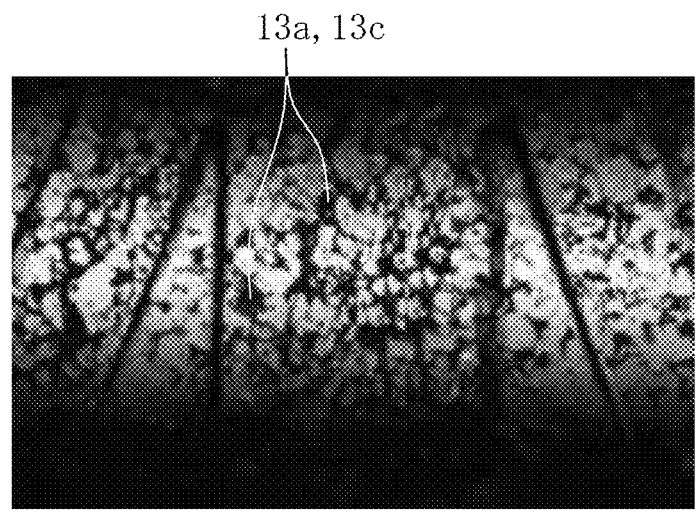
FIG. 6 is a photograph of the bearing surface of the slide bearing.

The radial bearing surfaces A and the thrust bearing surface B of the bearing sleeve 8 each have a surface opening ratio of 40% or more. The surface opening ratios of the bearing surfaces A and B are measured by analyzing photograph images of the bearing surfaces A and B. FIG. 6 is an enlarged photograph of the inner peripheral surface 8a (radial bearing surface A) of the bearing sleeve 8. The regions of black color correspond to the opening portions 13a or 13c. The surface opening ratio is determined by calculating a ratio of the black regions (opening portions 13a and 13c) in this image. The straight lines shown in FIG. 6 are each a boundary between the dynamic pressure groove and the crest portion.

The housing 7 comprises a side portion 7a and a bottom portion 7b (see FIG. 2). The side portion 7a has a cylindrical shape. The bottom portion 7b closes the opening portion formed at a lower end of the side portion 7a. In this embodiment, the side portion 7a and the bottom portion 7b are separately formed. The side portion 7a is formed into the cylindrical shape with a resin or a metal. The outer peripheral surface 8d of the bearing sleeve 8 is fixed to an inner peripheral surface 7a1 of the side portion 7a by bonding, press-fitting, or any other suitable means. The bottom portion 7b is formed into, for example, a disc shape with a resin or a metal, and is fixed to a lower end portion of the side portion 7a by press-fitting, bonding, or any other suitable means. A thrust bearing surface C is formed on an upper end surface 7b1 of the bottom portion 7b. The thrust bearing surface C has, for example, a dynamic pressure groove having a spiral shape of a pump-in type as a thrust dynamic pressure generating portion (not shown). For example, a herringbone shape or a radial groove shape may be adopted as the shape of the dynamic pressure groove. Moreover, the upper end surface 7b1 (thrust bearing surface C) of the bottom portion 7b may be formed into a flat surface, and a dynamic pressure groove may be formed in a lower end surface 2b2 of the flange portion 2b of the shaft member 2. Moreover, the side portion 7a and the bottom portion 7b of the housing 7 may be integrally formed.

The seal portion 9 projects radially inward from an upper end of the side portion 7a of the housing 7. In this embodiment, the seal portion 9 is formed integrally with the side portion 7a of the housing 7. An inner peripheral surface 9a of the seal portion 9 has a tapered shape gradually reduced in diameter toward the lower side. A wedge-shaped seal space S which is gradually reduced in radial width toward the lower side is defined between the inner peripheral surface 9a of the seal portion 9 and the outer peripheral surface 2a1 of the shaft portion 2a (see FIG. 2). In other cases, a tapered surface which is gradually reduced in diameter toward the upper side may be formed on the outer peripheral surface of the shaft portion 2a while the inner peripheral surface of the seal portion 9 is formed as a cylindrical surface, or a tapered surface may be formed on both of the inner peripheral surface of the seal portion 9 and the outer peripheral surface of the shaft portion 2a. Moreover, the seal portion 9 may be formed separately from the side portion 7a of the housing 7 and fixed to the upper end opening portion of the side portion 7a.

Oil (or grease) is injected into the fluid dynamic bearing device 1 having the configuration described above. In this embodiment, the space on an inner periphery of the housing 7 is filled with the oil, and an oil surface is formed in the seal space S.

The seal space S has a capacity which may absorb a change in volume of the oil filling the inside of the fluid dynamic bearing device 1. That is, the capacity of the seal space S is set so as to be larger than the amount of change in volume of the oil within an assumed usage temperature range of the fluid dynamic bearing device 1. In this embodiment, some of the inner pores of the bearing sleeve 8 are filled with the oxide film, and the oil content ratio is 4% or less. Therefore, the amount of oil impregnated into the bearing sleeve 8 and the total amount of oil inside the fluid dynamic bearing device 1 are reduced, thereby being capable of reducing the capacity (in particular, axial dimension) of the seal space S.

For example, when the bearing sleeve 8 having an inner diameter of φ4 mm and an axial dimension of 12.4 mm is formed of a related-art sintered oil-impregnated bearing, it is required that the axial dimension of the seal space S be set larger than at least 20% of the axial dimension of the bearing sleeve 8. Meanwhile, when the bearing sleeve 8 having the size described above is formed of the above-mentioned green compact having been subjected to the oxidation treatment, the axial dimension of the seal space S can be set equal to or smaller than 20% of the axial dimension of the bearing sleeve 8. As described above, through the reduction in axial dimension of the seal space S, the axial dimension of the fluid dynamic bearing device 1 can be reduced. Alternatively, while the axial dimension of the fluid dynamic bearing device 1 is maintained, a distance between radial bearing portions R1 and R2 in the axial direction (bearing span) may be increased by the amount of reduction in axial dimension of the seal space S, thereby being capable of increasing the load capacity and the bearing stiffness.

When the shaft member 2 rotates, the bearing surfaces, which are formed on the bearing sleeve 8 and the bottom portion 7b of the housing 7, and the shaft member 2 slide through intermediation of the oil film. In detail, a radial bearing gap is defined between each of the radial bearing surfaces A of the inner peripheral surface 8a of the bearing sleeve 8 and the outer peripheral surface 2a1 of the shaft portion 2a, and the pressure of the oil film in the radial bearing gap is increased by the dynamic pressure grooves G1 and G2 formed in the radial bearing surfaces A. With this, the first radial bearing portion R1 and the second radial bearing portion R2 which are configured to support the shaft member 2 in a non-contact state in the radial direction are formed. At the same time, thrust bearing gaps are defined between the lower end surface 8b (thrust bearing surface B) of the bearing sleeve 8 and the upper end surface 2b1 of the flange portion 2b and between the upper end surface 7b1 (thrust bearing surface C) of the bottom portion 7b of the housing 7 and the lower end surface 2b2 of the flange portion 2b, respectively. The pressure of the oil film in each of the thrust bearing gaps is increased by the dynamic pressure grooves formed in the thrust bearing surfaces B and C. With this, a first thrust bearing portion T1 and a second thrust bearing portion T2 which are configured to support the shaft member 2 in a non-contact state in both thrust directions are formed.

On this occasion, at least some of the inner pores of the bearing sleeve 8 are filled with the oxide film 12, and the bearing sleeve 8 has an oil content ratio of 4 vol % or less. Thus, even when the pressure of the oil film in the bearing gap is increased, entry of the oil from the surfaces (in particular, the radial bearing surfaces A and the thrust bearing surface B) of the bearing sleeve 8 to the inside can be suppressed. With this, the decrease in pressure of the oil film in the bearing gap can be suppressed, thereby being capable of enhancing the load capacities of the radial bearing portions R1 and R2 and the thrust bearing portions T1 and T2.

Moreover, the bearing surfaces A and B of the bearing sleeve 8 have the large number of opening portions 13a (see FIG. 5). Those opening portions 13a are minute recessed portions which are interrupted in communication with the inner pores 13b by the oxide film 12, and serve as oil reservoirs configured to retain the oil. During the rotation of the shaft member 2, the oil retained in the opening portions 13a is supplied to the bearing gaps. With this, the loss of the oil film in the bearing gaps is prevented, thereby being capable of preventing seizing caused by contact between the bearing sleeve 8 and the shaft member 2.

Now, description is made of a manufacturing method for the slide bearing (bearing sleeve 8) described above. The bearing sleeve 8 is manufactured through a compacting step, a degreasing step, an oxidation step, and an oil impregnation step. Now, the steps are described in detail.

(1) Compacting Step

The compacting step is a step of supplying the raw material powder into a mold, and compacting and forming the raw material powder to obtain a cylindrical green compact. A method for the compacting step is not particularly limited, and uniaxial press forming, and as well, forming with a multiaxial CNC press or the like may be adopted.

The raw material powder includes metal power capable of forming an oxidation film on particle surfaces (metal having a high ionization tendency), and mainly includes metal power such as iron powder or copper powder. The iron powder is usable irrespective of a production method thereof. For example, atomized powder or reduced powder may be used. The copper powder is also usable irrespective of a production method thereof. For example, electrolytic powder, atomized powder, or reduced powder may be used. Other than the above-mentioned powders, alloy powder containing iron or copper as a main component (for example, pre-alloyed powder having been alloyed in advance or partially diffusion-alloyed powder having been partially diffusion-alloyed) may also be used. Moreover, for the increase in strength and improvement in lubricity, metal powder having a low melting point, such as Sn or Zn, or carbon-based powder, such as black lead or carbon black, may be added to the raw material powder.

The metal powder contained in the raw material powder is formed substantially of metal powder of a single kind. Specifically, 99 wt % or more of metal powder contained in the raw material powder (or 95 wt % or more of the entirety of the raw material powder containing components other than metal) is formed of metal powder of a single kind. As the metal powder, there may be used, for example, powder formed of a single metal such as iron powder or copper powder, or alloy powder (for example, the pre-alloyed powder having been alloyed in advance). This is because, when a kind of metal varies, a thickness of the oxide film formed on surfaces of particles or adhesiveness with respect to a base member varies, and there is a fear in that the dimension accuracy or the bearing characteristics cannot be satisfied. When the dimension accuracy and the bearing characteristics are satisfied, metal powders of various kinds may be mixed.

A lubricant for forming may be added to the raw material powder so that lubrication is ensured between the raw material powder and a mold or between the particles of the raw material powder in the compacting step to be performed later. As the lubricant for forming, there may be used, for example, metal soap or amide wax. The lubricant for forming may be mixed as powder in the raw material powder. Alternatively, the lubricant for forming described above may be dispersed in a solvent, and the resultant solution may be sprayed onto the metal powder or the metal powder may be immersed in the solution, followed by removal of a solvent component through volatilization, to thereby coat the surface of the metal powder with the lubricant for forming.

In this embodiment, the raw material powder is formed only of pure iron powder (reduced iron powder) and the lubricant for forming. The lubricant for forming is contained in a ratio of from 0.1 wt % to 1 wt %, preferably from 0.3 wt % to 0.6 wt % with respect to the pure iron powder.

Figure 7:
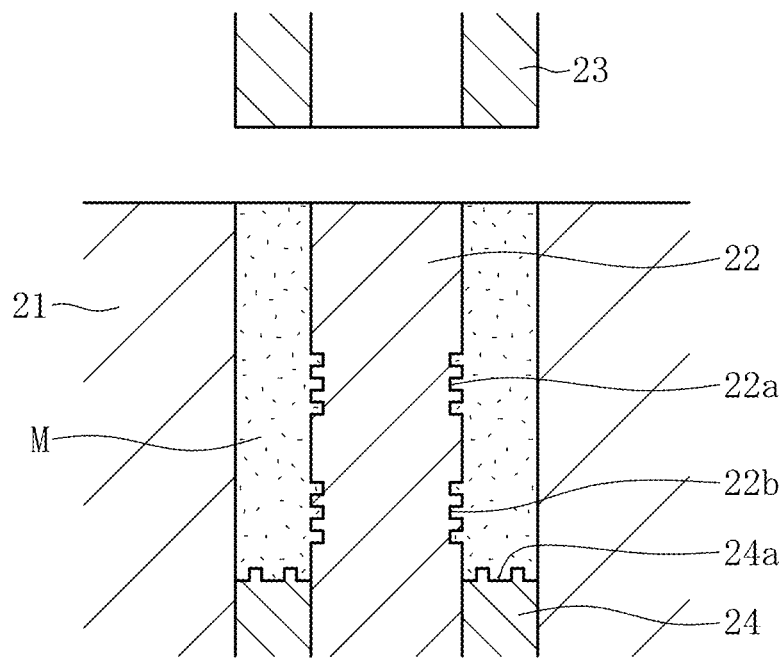
FIG. 7 is a sectional view of a forming mold configured to perform a compacting step (before forming).

The compacting step is performed through use of a forming mold illustrated in FIG. 7. The forming mold comprises a die 21, a core rod 22, an upper punch 23, and a lower punch 24. In an outer peripheral surface of the core rod 22, there are formed forming patterns 22a and 22b having shapes corresponding to the dynamic pressure grooves G1 and G2, respectively. In an upper surface of the lower punch 24, there is formed a forming pattern 24a having a shape corresponding to the dynamic pressure groove G3. In addition, although not illustrated in the drawings, in an inner peripheral surface of the die 21, there is formed a forming pattern having a shape corresponding to the axial grooves 8d1. Moreover, in a lower surface of the upper punch 23, there are formed forming patterns having a shape corresponding to the annular groove 8c1 and the radial grooves 8c2.

Figure 8:
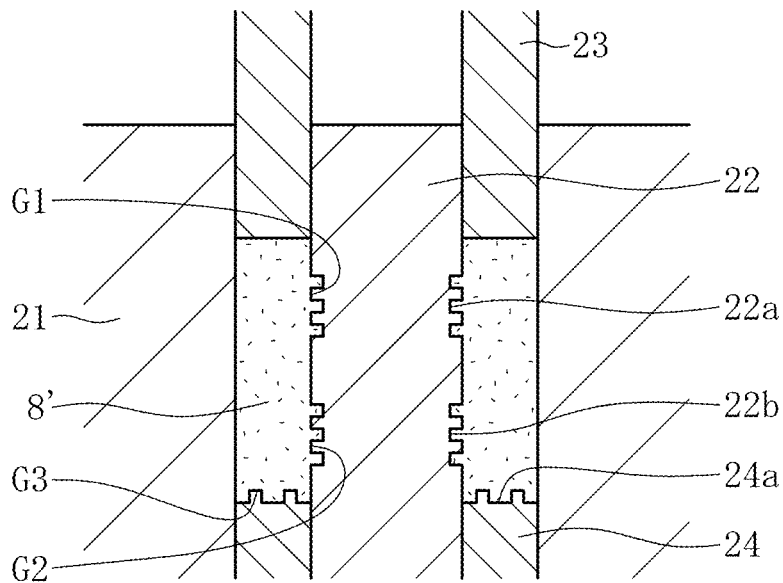
FIG. 8 is a sectional view of the forming mold configured to perform the compacting step (at the time of completion of forming).

First, as illustrated in FIG. 7, in a cavity defined by the die 21, the core rod 22, and the lower punch 24, a raw material powder M is charged. Next, as illustrated in FIG. 8, the upper punch 23 is lowered to compress the raw material powder M, thereby forming a green compact 8'. At the same time, the dynamic pressure grooves G1 and G2 are formed in an inner peripheral surface of the green compact 8' by the forming patterns 22a and 22b of the core rod 22, and the dynamic pressure groove G3 is formed in a lower end surface of the green compact 8' by the forming pattern 24a of the lower punch 24. The dynamic pressure groove G3 in the lower end surface of the green compact 8' may be formed in another step.

Figure 9:
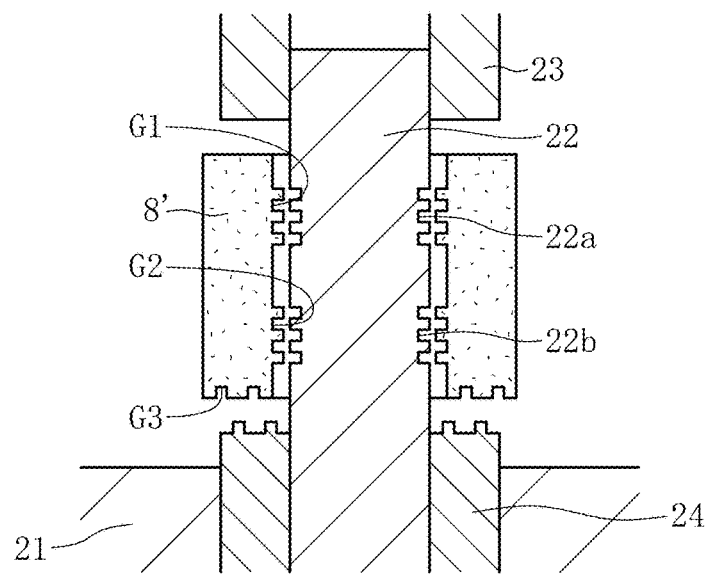
FIG. 9 is a sectional view of the forming mold configured to perform the compacting step (at the time of separation).
Figure 10:
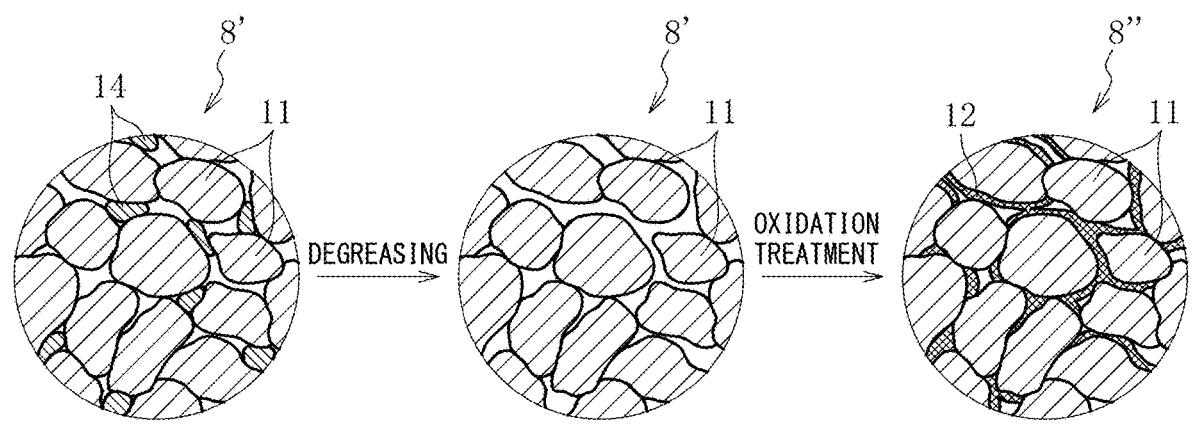
FIG. 10 are each a sectional structure view of a green compact, in which the sectional structure view on the left side is an illustration of the green compact before heating, the sectional structure view at the center is an illustration of the green compact after degreasing, and the sectional structure view on the right side is an illustration of the green compact (oxidized green compact) after oxidation treatment.

After that, as illustrated in FIG. 9, the green compact 8' is removed from an inner periphery of the die 21. As a result, a radially inward force having been applied to the green compact 8' is released, and spring back occurs in the green compact 8'. With this, the inner peripheral surface of the green compact 8' is radially expanded, and the green compact 8' is separated from the forming patterns 22a and 22b of the core rod 22.

In general, a sintered part having a higher density has higher strength. However, when an increase in strength is to be achieved through oxidation treatment on the green compact as in this embodiment, in a case in which green density is excessively high, an oxidizing gas, such as air, cannot penetrate into the inside of the green compact, and the formation of the oxide film is limited to only the surface layer of the green compact. Thus, although the excessive high green density causes the increase in strength, it is not preferable. From the above-mentioned viewpoint, it is desired to set the green density to 7.2 g/cm$^3$ or less (true density ratio of 91% or less), preferably 7.0 g/cm$^3$ or less (true density ratio of 89% or less).

Meanwhile, an excessively low green density may cause occurrence of chipping or breakage at the time of handling (a large rattler value), and less formation of the oxide film between the particles due to an excessively long distance between the particles. From the above-mentioned viewpoint, it is desired to set the green density to 5.8 g/cm$^3$ or more (true density ratio of 74% or more), preferably 6.0 g/cm$^3$ or more (true density ratio of 76% or more). In particular, in order to set the oil content ratio of the bearing sleeve 8 to 4 vol % or less, it is preferred that the green density be set high. Specifically, it is desired to set the green density to 6.3 g/cm³ or more (true density ratio of 80% or more), preferably 6.7 g/cm³ or more (true density ratio 85% or more). The green density is measured by a dimension measurement method. Moreover, the density of the green compact is nearly unchanged even after the degreasing step and the oxidation step to be performed later.

(2) Degreasing Step

The degreasing step is a step of heating the green compact to remove a lubricant for forming, which is contained in the green compact (dewaxing). The degreasing step is performed at a temperature higher than the decomposition temperature of the lubricant for forming and lower than the temperature of the oxidation step described below. For example, the degreasing step is performed through heating at from 350° C. to 400° C. for from 60 minutes to 120 minutes. In the green compact 8' before degreasing, as illustrated in the view on the left side in FIG. 10, a lubricant for forming 14 is arranged in a gap among the iron particles 11. However, through the degreasing step, as illustrated in the view at the center in FIG. 10, the lubricant for forming 14 is lost, and the green compact 8' formed only of the iron particles 11 can be obtained.

In the manufacturing steps for a related-art sintered bearing, the green compact is held at high temperature in a sintering step. Thus, the lubricant component contained in the green compact is dissolved, and is not contained in a finished product after sintering. However, when the present invention is applied, the lubricant component may remain depending on the density of the green compact, an oxidation treatment temperature, and a retention time period. Therefore, it is desired to adopt such a method that the degreasing step for decomposing and removing the lubricant component in advance is provided prior to the oxidation treatment and the oxidation treatment is successively performed in the same atmosphere after the degreasing step. However, it has been found that an increase in strength can be achieved even when the oxidation treatment is performed with the lubricant for forming being contained without performing the degreasing step. Alternatively, the degreasing step may be performed with a separate heating device in an atmosphere different from that in the oxidation step (for example, in an inert gas, a reducing gas, or vacuum).

(3) Oxidation Step

In the oxidation step, the green compact is heated in an oxidizing atmosphere. With this, the oxide film 12 is formed on the surface of each particle 11 of the metal powder (iron powder) as illustrated in the view on the right side in FIG. 10, to thereby bond the particles 11 to each other through intermediation of the oxide film 12 and thus increase the strength. In this manner, an oxidized green compact 8" is obtained. Specifically, through the oxidation step, the oxide film formed on the surfaces of the particles of the metal powder spreads through a space among the iron particles 11 to form a network. Such formation of the network replaces the binding force given by the sintering at high temperature in the related art, thereby increasing the strength of the oxidized green compact 8". Moreover, in this embodiment, not all of the particles of the iron powder serving as a main component are joined through intermediation of the oxide film, and some particles are directly held in contact with each other and are fused to each other without intermediation of the oxide film.

Through the formation of the oxide film 12, at least some of the inner pores of the oxidized green compact 8" are filled. On this occasion, at least some of the opening portions of the surfaces of the oxidized green compact 8" and the inner pores 13b are interrupted in communication therebetween by the oxide film 12. With this, a large number of opening portions 13a having an inner side thereof being closed with the oxide film 12 are formed in the surfaces of the oxidized green compact 8" (see FIG. 5).

The treatment conditions of the oxidation treatment described above (a heating temperature, a heating time period, and a heating atmosphere) are set so that the strength required for the dynamic bearing is given to the oxidized green compact 8" and that the oxide film 12 causes the oxidized green compact 8" to have an oil content ratio of 4 vol % or less and a surface opening ratio of 40% or more. Specifically, in the oxidation step in this embodiment, the heating temperature is set to 350° C. or more, preferably 400° C. or more. In addition, the heating temperature is set to 600° C. or less, preferably 550° C. or less because an excessively high heating temperature causes a large dimensional change in the green compact. The heating time period is appropriately set within a range of from 5 minutes to 2 hours, and is set to, for example, from 10 minutes to 20 minutes. The oxidized green compact 8" has strength required for the bearing sleeve 8, specifically, a radial crushing strength of 120 MPa or more, preferably 150 MPa or more.

An oxidizing atmosphere is adopted as the heating atmosphere in order to promote positive oxidation. It is preferred to adopt an oxidizing atmosphere exhibiting a formation rate of the oxide film lower than that in a steam atmosphere because the steam atmosphere exhibits an excessive high formation rate of the oxide film. Specifically, it is preferred that the heating be performed in any one of an air atmosphere, an oxygen atmosphere, and an atmosphere of an oxidizing gas obtained by mixing an inert gas, such as nitrogen or argon, with air or oxygen, and it is most preferred that the heating be performed in the air atmosphere. Through the oxidation treatment in the air atmosphere, the oxide film formed on the surfaces of the oxidized green compact can be suppressed, thereby being capable of suppressing degradation in surface roughness of the oxidized green compact. Moreover, in order to obtain the strength which is tolerable for use as the bearing sleeve 8 (for example, a radial crushing strength of 120 MPa), it is preferred that the oxygen fraction of the heating atmosphere be 2 vol % or more.

An iron oxide film formed on the surface of the iron powder is formed of, for example, $Fe_3O_4$, $Fe_2O_3$, or FeO. The ratio between those oxide films varies depending on the materials and treatment conditions. For example, when the green compact is heated in the water vapor atmosphere, the oxide film is formed of a single phase substantially consisting of $Fe_3O_4$. Meanwhile, when the green compact is heated in the air atmosphere, the oxide film is formed of $Fe_3O_4$, $Fe_2O_3$, or a mixed phase of $Fe_3O_4$ and $Fe_2O_3$. Thus, when a composition of the oxide film formed in the oxidized green compact is analyzed, and $Fe_2O_3$ is contained in the oxide film, it can be assumed that the oxidation treatment for the green compact has been conducted in the air atmosphere.

An increase in strength through the oxidation step described above can be exhibited in a green compact formed of iron, copper, or a material obtained by mixing iron and copper at various ratios (an iron-based material, a copper-based material, an iron-copper-based material, or a copper-iron-based material) used in a conventional general sintered member. However, it is preferred that the metal powder be formed only of a single kind (for example, iron powder) because the thickness of the oxide film and the adhesiveness of the oxide film with respect to the particles can be set even.

In the oxidation step described above, the treatment temperature is lower than the sintering step at high temperature in the related art. Thus, a change in dimension of the green compact after the treatment is small. Therefore, degradation in dimension accuracy of the oxidized green compact, in particular, dimension accuracy of the dynamic pressure groove (for example, groove depth) can be suppressed, thereby being capable of satisfying the required accuracy without sizing. In particular, as in this embodiment, when the dynamic pressure groove is formed simultaneously with the forming of the green compact in the compacting step, the change in dimension of the green compact by the oxidation step to be performed later is suppressed. Thus, the dimension accuracy of the inner peripheral surface and the dynamic pressure groove (for example, groove depth) of the green compact can be maintained. With this, the sizing step after the oxidation step can be omitted. Thus, the manufacturing steps for the bearing can be shortened so that the cost can be reduced, and the bearing and the forming mold can easily be designed.

The oxidation step described above is applicable irrespective of the shape and dimensions of the green compact. In addition, the surface of the oxidized green compact is coated with the oxide film. As a result, a high anti-rust effect is exhibited, which eliminates the need for anti-rust treatment in some cases. In addition, the treatment temperature in the oxidation step is relatively low, and hence an additive that is altered or decomposed at a temperature higher than the treatment temperature (for example, a material exhibiting slidability or lubricity) may be added, to thereby highly functionalize a product.

(4) Oil Impregnation Step

The oil impregnation step is a step of allowing the inner pores of the oxidized green compact to be impregnated with lubricating oil. Specifically, the oxidized green compact is immersed in the oil in an environment at reduced pressure, and then the pressure is returned to the atmospheric pressure. Thus, the oil penetrates into the inner pores of the oxidized green compact through the opening portions of the surfaces of the oxidized green compact. Through the steps described above, the bearing sleeve 8 according to this embodiment is completed. The oil impregnation step may be omitted, and an oxidized green compact having no oil impregnated thereinto may be used as the bearing sleeve 8. In this case, after the fluid dynamic bearing device 1 is assembled using the bearing sleeve 8 in a dried state, when the oil is charged into the internal space of the fluid dynamic bearing device 1 through, for example, vacuum impregnation, the oil is impregnated into the inner pores of the bearing sleeve 8.

The present invention is not limited to the embodiment described above. For example, in the embodiment described above, description is made of the case in which both the radial bearing surface and the thrust bearing surface are formed on the bearing sleeve 8, but the present invention is not limited to this configuration. The present invention may be applied to a slide bearing comprising any one of the radial bearing surface and the thrust bearing surface. For example, the slide bearing according to the present invention may be applied as the bottom portion 7*b* (thrust bush) of the housing 7 described above.

Moreover, in the embodiment described above, description is made of the case in which the dynamic pressure groove is formed in the bearing sleeve 8, but the present invention is not limited to this configuration. For example, both the inner peripheral surface 8*a* of the bearing sleeve 8 and the outer peripheral surface 2*a*1 of the shaft member 2 may have a cylindrical surface to form a circular bearing. In this case, whirling of the shaft member 2 generates the dynamic pressure in the oil film in the bearing gap defined between the bearing sleeve 8 and the shaft member 2 so that a fluid dynamic bearing configured to float and support the shaft by the dynamic pressure is formed. Such fluid dynamic bearing is applied to a case in which a shaft rotating at relatively high speed is supported. However, application of the present invention is not limited to this case. The slide bearing according to the present invention is also applicable as a mating member rotating at relatively low speed or a bearing configured to support, in a sliding manner through intermediation of the lubricating film, a mating member which rocks or linearly moves.

Moreover, in the embodiment described above, description is made of the case in which the bearing sleeve 8 (dynamic bearing) is a porous oil-impregnated bearing and is incorporated into the fluid dynamic bearing device 1 of the full-fill type which is filled with the oil. However, the present invention is not limited to this. For example, the bearing sleeve 8 may be incorporated into a fluid dynamic bearing device of a partial-fill type in which air and oil are mixed with each other. In this case, the bearing sleeve 8 can be used in a state in which the amount of oil to be impregnated into the inner pore is smaller than that of the embodiment described above, or a state in which the oil is not actively impregnated into the inner pores.

Moreover, in the embodiment described above, the side portion 7*a* of the housing 7 and the seal portion 9 are formed into a single component, and the bottom portion 7*b* of the housing 7 is separately formed, but the present invention is not limited to this configuration. For example, the side portion 7*a* and the bottom portion 7*b* of the housing 7 may be formed into a single component, and the seal portion 9 may be separately formed. Alternatively, the side portion 7*a* of the housing 7, the bottom portion 7*b* of the housing 7, and the seal portion 9 may be separately formed.

Moreover, in the embodiment described above, description is made of the fluid dynamic bearing device having the full-fill structure in which the oil surface is formed at only one position (inside the seal space S). However, the slide bearing according to the present invention may be incorporated into a fluid dynamic bearing device having a partial-fill structure in which oil surfaces are formed at a plurality of positions.

Moreover, in the embodiment described above, description is made of the case in which the slide bearing (bearing sleeve 8) is fixed and the mating member (shaft member 2) rotates. However, instead, the mating member may be fixed, and the slide bearing may rotate. Moreover, in the embodiment described above, description is made of the case in which the lubrication fluid is oil. However, for example, grease, a magnetic fluid, or air may be used as the lubrication fluid. Moreover, the slide bearing according to the present invention can be used while being incorporated into not only the spindle motor for a disc drive device such as an HDD but also, for example, a fan motor for a cooling fan or a polygon scanner motor for a laser beam printer.

Example of First Invention of Present Application

In order to confirm an effect of the first invention of the present application, the following tests were performed.

(1) Relationship Between Oil Content Ratio and True Density Ratio

Degreasing treatment and oxidation treatment were performed on various green compacts having different densities, and cylindrical test pieces of various kinds were produced. After that, an oil content ratio of each test piece was measured. The test piece (oxidized green compact) had a configuration similar to that of the slide bearing (bearing sleeve 8) according to the embodiment described above, and was formed of iron particles and an oxide film formed on surfaces of the iron particles. Measurement of the oil content ratio was performed based on JIS Z 2501:2000.

Figure 11:
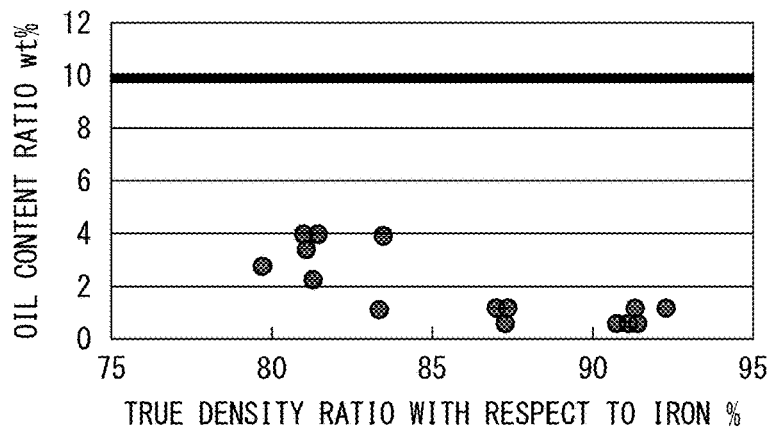
FIG. 11 is a graph for showing a relationship between a true density ratio and an oil content ratio in the oxidized green compact.

In FIG. 11, there is shown measurement results of oil content ratios of the test pieces. According to FIG. 11, even when the true density ratio is about 80%, the oil content ratio is a half of 10 vol % or less (for example, 4 vol % or less) being a lower limit value of the oil content ratio of a general sintered oil-impregnated bearing. Moreover, when the true density ratio is equal to or more than 85%, the oil content ratio is substantially 0 vol % (2 vol % or less). Therefore, it was found that the oil content ratio can be sufficiently suppressed by performing the degreasing treatment and the oxidation treatment on the green compact.

(2) Oil Film Formation Ratio

The degreasing treatment and the oxidation treatment were performed on a green compact formed of iron powder and a lubricant for forming, and a slide bearing of Example was produced. The slide bearing of Example has a configuration similar to that of the bearing sleeve 8 (see FIG. 3 and FIG. 4) according to the embodiment described above, and had a radial crushing strength of 150 MPa or more, an oil content ratio of 4 vol % or less, and a surface opening ratio of 40% or more in the bearing surface. Meanwhile, a related-art slide bearing formed of an iron-based sintered metal was used as Comparative Example. The slide bearing of Comparative Example had a shape similar to that of the bearing sleeve 8 according to the embodiment described above, but was produced by a producing method different from that of Example. Specifically, a cylindrical green compact having no dynamic pressure groove was formed. After that, the green compact was sintered so that a sintered compact was obtained. Then, the sintered compact was subjected to sizing so that the dynamic pressure groove was formed. Further, after that, an inner peripheral surface of the sintered compact was sealed by rotation sizing.

The slide bearings of Example and Comparative Example were incorporated into motors, respectively. While each motor was being rotated, the amount of flow of electricity between the shaft and the slide bearing was measured. With this, the oil film formation ratio was measured. Specifically, while each motor was rotated at a speed of 2,000 r/min in a normal-temperature (25° C.) environment, a state in which the shaft is caused to stand upright in the vertical direction and is retained in this state and a state in which the shaft is caused to rock between the vertical direction and the horizontal direction were alternately given at intervals of 2 seconds, and the oil film formation ratio given in such states was measured.

Figure 12:
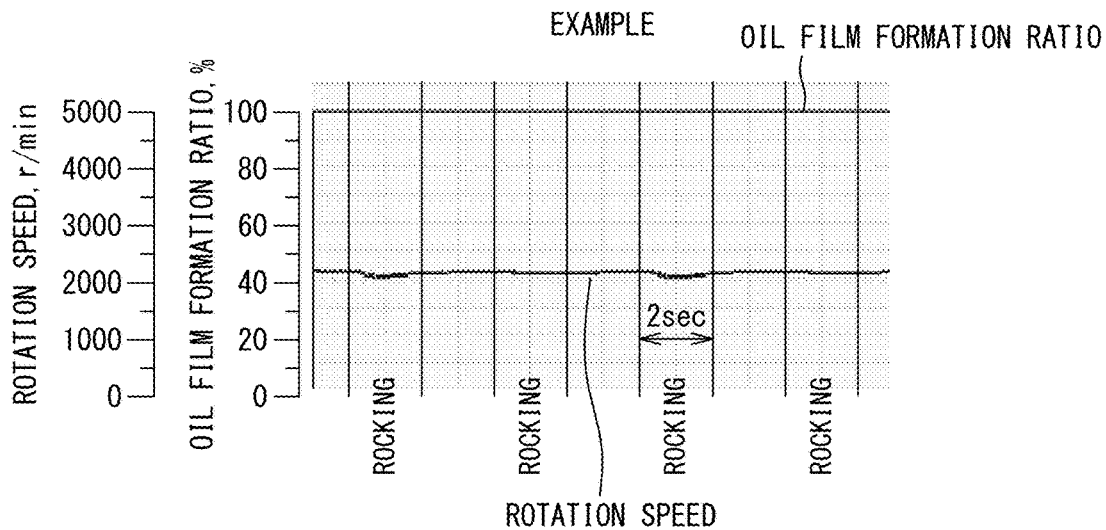
FIG. 12 is a graph for showing a rotation speed of a motor and an oil film formation ratio in a slide bearing of Example.
Figure 13:
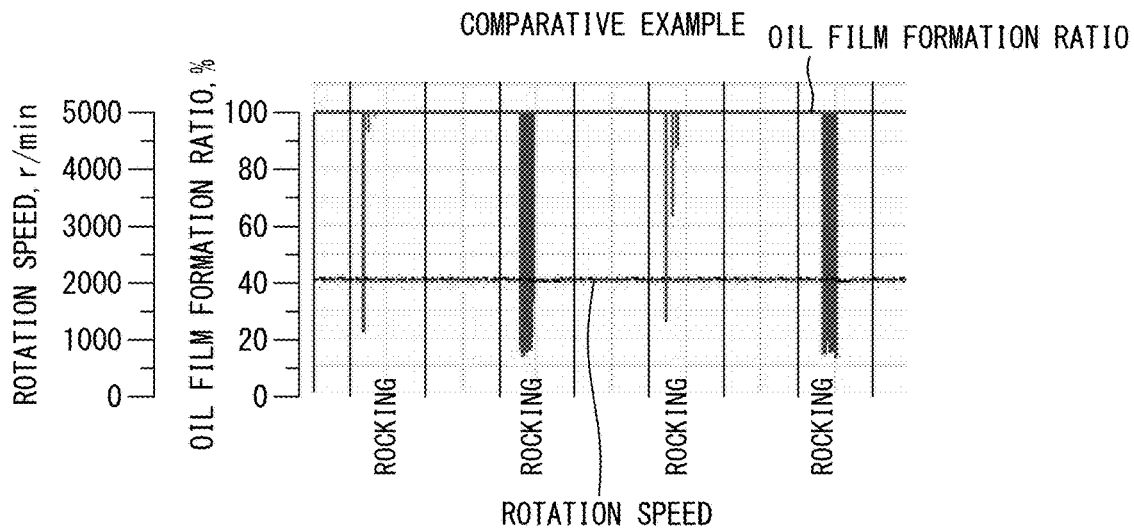
FIG. 13 is a graph for showing a rotation speed of a motor and an oil film formation ratio in a slide bearing of Comparative Example.

As shown in FIG. 13, in the case of the motor using the slide bearing of Comparative Example, it was found that the oil film formation ratio was reduced at the time of rocking, and the shaft and the slide bearing were brought into contact with each other. In contrast, as shown in FIG. 12, in the case of the motor using the slide bearing of Example, the oil formation ratio was always 100% both at the time of standing upright and at the time of rocking. Thus, it was confirmed that, through use of the slide bearing of Example, the load capacity was improved, thereby being capable of preventing contact between the shaft and the slide bearing.

Example of Second Invention of Present Application

In order to confirm the effect of the second invention of the present application, in particular, the effect that the dynamic pressure groove can be formed deeper than that of the related-art dynamic bearing formed of a sintered compact, the following tests were performed.

Test pieces (Examples 1 and 2) each formed of a cylindrical green compact manufactured by the method according to the present invention and a test piece (Comparative Example) formed of a cylindrical sintered compact manufactured by the related-art method were prepared. Specifically, Examples 1 and 2 were manufactured by forming a green compact having a dynamic pressure groove and then performing the degreasing step and the oxidation step. With regard to Comparative Example, a cylindrical green compact was formed, and after that, the green compact was sintered so that a sintered compact was obtained. Further, the sintered compact was subjected to sizing so that the dynamic pressure groove was formed. Examples 1 and 2 were each formed consisting of iron (comprising an oxide film), and Comparative Example was formed of copper and iron. In Example 1, a relative density with respect to the true density was less than 80% (specifically, 6.2 g/cm$^3$). In Example 2, a relative density was 80% or more (specifically, 6.7 g/cm$^3$). Each test piece had an inner diameter of 0.5 mm, an outer diameter of φ3 mm, and an axial width of 3.3 mm.

A radial crushing strength, a dimension change ratio before and after heating, and a depth of the dynamic pressure groove were measured for each test piece. For Examples 1 and 2 and Comparative Example, the above-mentioned items were measured and calculated for three test pieces of each of Examples 1 and 2 and Comparative Example, and average values thereof were used.

The radial crushing strength was measured and calculated in accordance with the method described in JIS Z 2507. The radial crushing strength is defined as strength of a cylindrical test piece which can be determined by a certain method from a crushing annular load. The radial crushing load is defined as a load which is given when the cylindrical test piece is compressed on two surfaces parallel to an axis and formation of cracks is started. Evaluation references for the radial crushing strength were as follows.

~120 MPa: x
120~150 MPa: ○
150 MPa~: ◎

With regard to the dimension change ratio, measurement was made of an inner diameter, an outer diameter, and an axial width of each test piece before and after heating (corresponding to the degreasing step and the oxidation step in Example, and the sintering step in Comparative Example), and the dimension change ratio was calculated based on the following expression.

Dimension change ratio (%)={dimension of test piece after heating (mm)−dimension of test piece before heating (mm)}×100/dimension of test piece before heating (mm)

Evaluation references for the dimension change ratio were as follows.

~0.4%: ◎
0.4~1.0%: ○
1.0%~: x

Figure 14:
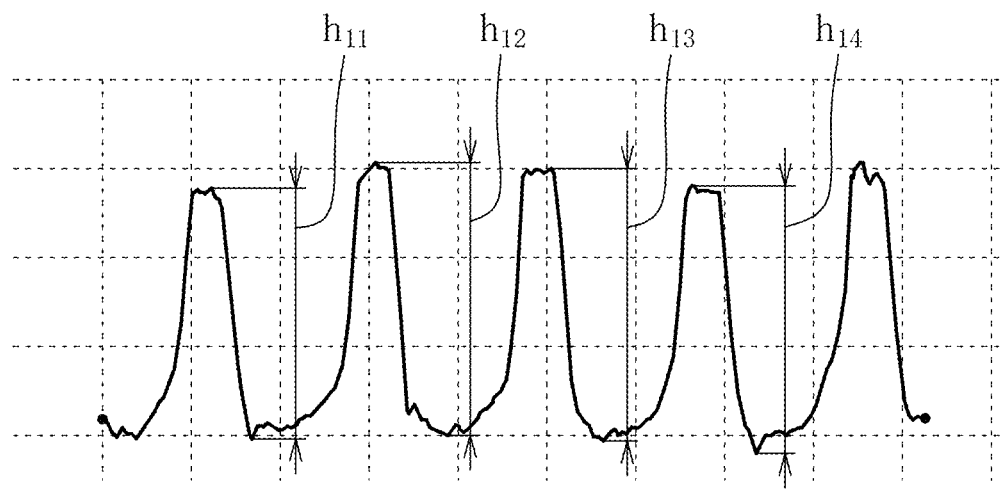
FIG. 14 are each an illustration of a profile of an inner peripheral surface of an oxidized green compact in a circumferential direction, in which the illustration in an upper stage is a profile of an inner peripheral surface of an oxidized green compact (Example) in the circumferential direction having been subjected to oxidation treatment in an air atmosphere, and the illustration in a lower stage is a profile of an inner peripheral surface of an oxidized green compact (Comparative Example) in the circumferential direction having been subjected to oxidation treatment in a water vapor atmosphere.
Figure 14:
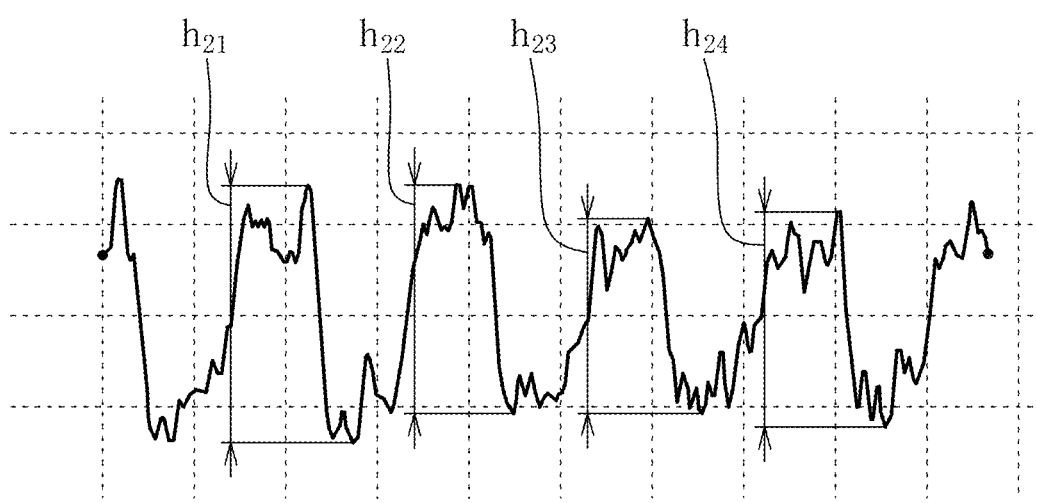

The depth of the dynamic pressure groove was measured through use of a circularity meter. Specifically, in the inner peripheral surface of the test piece, at an axial position at which the crest portions and the groove portions appear alternately in the circumferential direction, a profile of the inner peripheral surface of the test piece in the circumferential direction was measured with the circularity meter. The measured profile was converted into a linear shape, and a maximum difference in height (radial position) between the groove portion and the crest portion adjacent to each other was defined as a depth of the dynamic pressure groove. In this case, the depth of the dynamic pressure groove of the test piece was measured for the number of the dynamic pressure grooves (see h11 to h14 and h21 to h24 in FIG. 14), and the depths of the dynamic pressure grooves were evaluated. Evaluation references for the depth of the dynamic pressure groove were as follows.

~3 μm: x
3~6 μm: ○
6 μm~: ◎

TABLE 1

| | Material | Density [g/cm³] | Radial crushing strength [Mpa] | Dimension change ratio [%] Inner diameter | Outer diameter | Width | Dynamic pressure groove depth [μm] |
|---|---|---|---|---|---|---|---|
| Comparative Example | Cu + 40% Fe | 7.2 | ◎ | X | X | X | X |
| Example 1 | Only Fe | 6.2 | ◎ | ○ | ○ | ○ | ◎ |
| Example 2 | ↑ | 6.7 | ◎ | ◎ | ◎ | ◎ | ◎ |

As shown in Table 1 above, in Comparative Example with the green compact having been subjected to sintering, the dimension change ratio before and after sintering was large. Moreover, the sintered compact of Comparative Example had a small spring back amount after forming of the dynamic pressure groove. Thus, it was inevitably required to set the depth of the dynamic pressure groove to be small. In contrast, in Examples 1 and 2 in which the green compact has not been subjected to sintering but has been subjected to the oxidation treatment at relatively low temperature, the dimension change ratio before and after the oxidation treatment is small, and Example 2 having higher density has an especially smaller dimension change ratio. Thus, Examples 1 and 2 can maintain the dimension accuracy even without sizing. Moreover, the green compacts of Examples 1 and 2 have a large spring back amount given after forming of the dynamic pressure groove, and hence the dynamic pressure groove can be formed so as to be deep. Specifically, the depth of the dynamic pressure groove can be larger than 3 μm, that is, a ratio h/d of the depth h (μm) of the dynamic pressure groove to the inner diameter d (mm) can be larger than 2. Further, Examples 1 and 2 each have a radial crushing strength of 150 MPa or more which is required for the dynamic bearing. Therefore, according to the present invention, it was confirmed that the dynamic pressure groove can be formed deeper than the related-art dynamic bearing formed of a sintered compact while ensuring the strength or the dimension accuracy.

Example of Third Invention of Present Application

In order to confirm an effect of the third invention of the present application, the following tests were performed.

Green compacts of three kinds comprising different raw material powders were formed, and each green compact was heated in the air atmosphere. With this, oxidized green compacts (test pieces) of three kinds in which particles of the metal powder were bonded by the oxide film were manufactured. Among those test pieces, the test piece formed only of reduced iron powder was referred to as Example 1. The test piece formed only of atomized iron powder was referred to as Example 2. The test piece formed of copper powder and 40% reduced iron powder was referred to as Comparative Example. Evaluation references for the radial crushing strength and the dimension change ratio for each test piece are shown in Table 2 and Table 3 given below, and test results are shown in Table 4 given below. The radial crushing strength was measured by the method described in JIS Z 2507:2000. Moreover, the dimension change ratio is a ratio of a change in dimension before and after the oxidation treatment, and was calculated based on the following expression.

Dimension change ratio (%)={(dimension after oxidation treatment-dimension before oxidation treatment)/dimension before oxidation treatment}×100

TABLE 2

| Radial crushing strength [Mpa] | Judgment |
|---|---|
| ~120 | X |
| 120~150 | ○ |
| 150~ | ◎ |

TABLE 3

| Inner diameter dimension change ratio [%] | Judgment |
|---|---|
| ~0.4 | ◎ |
| 0.4~1.0 | ○ |
| 1.0~ | X |

TABLE 4

| | Material | Radial crushing strength | Dimension change ratio |
|---|---|---|---|
| Example 1 | OnlyFe (reduced iron powder) | ◎ | ◎ |
| Example 2 | Only Fe (atomized iron powder) | ○ | ◎ |
| Comparative Example | Cu + 40% Fe (reduced iron powder) | ◎ | X |

From the test results shown in Table 4, it was confirmed that Examples 1 and 2 each formed of metal powder of a single kind have a smaller dimension change ratio than that of Comparative Example formed of metal powders of various kinds. Moreover, it was confirmed that, of Examples 1 and 2, Example 1 formed only of reduced iron powder has a radial crushing strength higher than that of Example 2 formed only of atomized iron powder.

REFERENCE SIGNS LIST 1 fluid dynamic bearing device
2 shaft member
7 housing
8 bearing sleeve (slide bearing)
8' green compact
8" oxidized green compact
9 seal portion
11 iron particle
12 oxide film
13a opening portion
13b inner pore
14 lubricant for forming
A radial bearing surface
B, C thrust bearing surface
G1, G2 (radial) pressure groove
G3 (thrust) pressure groove
R1, R2 radial bearing portion
T1, T2 thrust bearing portion
S seal space

The invention claimed is:

1. A slide bearing, comprising an oxidized green compact in which particles of metal powder are bonded to each other by an oxide film formed on surfaces of the particles, the oxidized green compact having a bearing surface configured to slide, through intermediation of a lubricating film, relative to a mating member to be supported,
   wherein the bearing surface has opening portions, and the opening portions and inner pores are interrupted in communication therebetween by the oxide film,
   wherein the oxidized green compact has an oil content ratio of 4 vol % or less, and
   wherein the bearing surface has a surface opening ratio of 40% or more.

2. The slide bearing according to claim 1, wherein the oxidized green compact has an oil passage rate of 0.01 g/10 min or less when a pressure of 0.4 MPa is applied for 10 minutes.

3. The slide bearing according to claim 2, wherein the bearing surface comprises a cylindrical surface having no dynamic pressure groove.

4. The slide bearing according to claim 2, wherein the bearing surface comprises a dynamic pressure groove formed through mold-forming.

5. The slide bearing according to claim 1, wherein the bearing surface comprises a smooth cylindrical surface having no dynamic pressure groove.

6. The slide bearing according to claim 1, wherein the bearing surface comprises a dynamic pressure groove formed through mold-forming.

7. The slide bearing according to claim 6, wherein a ratio h/d of a depth h of the dynamic pressure groove to an inner diameter d of the oxidized green compact is more than 0.002.

8. The slide bearing according to claim 1, wherein the metal powder contained in the oxidized green compact comprises a metal of a same composition which occupies 99 wt % or more of the metal powder.

9. The slide bearing according to claim 1, wherein the metal powder contained in the oxidized green compact comprises iron powder which occupies 99 wt % or more of the metal powder.

10. The slide bearing according to claim 9, wherein the oxide film comprises $Fe_3O_4$, $Fe_2O_3$, or a mixture of $Fe_3O_4$ and $Fe_2O_3$.

11. The slide bearing according to claim 1, wherein the metal powder contained in the oxidized green compact comprises reduced powder which occupies 99 wt % or more of the metal powder.

12. A fluid dynamic bearing device, comprising:
   the slide bearing of claim 1; and
   a shaft member serving as the mating member inserted along an inner periphery of the slide bearing,
   wherein the shaft member is supported in a non-contact state so as to be relatively rotatable by pressure of a lubricating film in a radial bearing gap defined between a bearing surface of the slide bearing and an outer peripheral surface of the shaft member.

13. A motor, comprising:
   the fluid dynamic bearing device of claim 12;
   a rotor magnet provided on a rotary side of one of the slide bearing and the shaft member; and
   a stator coil provided on a stationary side of one of the slide bearing and the shaft member.

* * * * *